(12) United States Patent
Kobayashi et al.

(10) Patent No.: US 8,409,007 B2
(45) Date of Patent: Apr. 2, 2013

(54) SERVER APPARATUS AND GAME SYSTEM

(75) Inventors: Kenji Kobayashi, Tokyo (JP); Yukizumi Terao, Tokyo (JP); Yukihiro Sato, Tokyo (JP); Masaru Nakamura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 879 days.

(21) Appl. No.: 12/065,824

(22) PCT Filed: Aug. 31, 2006

(86) PCT No.: PCT/JP2006/317276
§ 371 (c)(1),
(2), (4) Date: Mar. 5, 2008

(87) PCT Pub. No.: WO2007/029603
PCT Pub. Date: Mar. 15, 2007

(65) Prior Publication Data
US 2009/0298593 A1 Dec. 3, 2009

(30) Foreign Application Priority Data
Sep. 5, 2005 (JP) ................................. 2005-256819

(51) Int. Cl.
*A63F 9/24* (2006.01)
*G06F 17/00* (2006.01)
(52) U.S. Cl. ......................................................... 463/42
(58) Field of Classification Search .................... 463/42; 707/607
See application file for complete search history.

(56) References Cited

U.S. PATENT DOCUMENTS
5,830,064 A 11/1998 Bradish et al.
2002/0002074 A1 1/2002 White et al.
(Continued)

FOREIGN PATENT DOCUMENTS
EP 1371403 A2 12/2003
EP 1479422 A2 11/2004
(Continued)

OTHER PUBLICATIONS

"E-Time" De Kazoku no Schedule-hyo o Tsukuru (Creating A Schedule for Your Family With "e-Time," Gekkan Tacchi PC (Monthly Touch PC) 2 Gatsugo (February Issue) vol. 6, No. 2, Mainichi Communications Inc., Feb. 24, 2001, pp. 66-69.
(Continued)

*Primary Examiner* — Melba Bumgarner
*Assistant Examiner* — Syvila Weatherford
(74) *Attorney, Agent, or Firm* — Sughrue Mion, PLLC

(57) ABSTRACT

In a game system, a server apparatus (3) that communicates with a plurality of game devices (1) stores play data elements for a plurality of players and public IDs for identifying a plurality of players in a latest play data table (T1) and a public ID table (T2). The server apparatus (3) transmits to a mobile terminal (4), which is being used by a player, information depending on latest play data elements stored in the latest play data table (T1), the latest play data elements belonging to other players who have been registered with the personal relationship table (T3) as a friend of the player possessing the mobile terminal (4). Upon receiving a public-ID-change request from a mobile terminal (4), which is being used by a player, the server apparatus (3) changes the public ID of the player stored in the public ID table (T2).

12 Claims, 20 Drawing Sheets

U.S. PATENT DOCUMENTS

| | | | |
|---|---|---|---|
| 2002/0038345 A1 | 3/2002 | Takatsuka et al. | |
| 2002/0183116 A1 | 12/2002 | Takahashi et al. | |
| 2002/0187834 A1 | 12/2002 | Rowe et al. | |
| 2003/0232647 A1* | 12/2003 | Moser | 463/29 |
| 2003/0233537 A1* | 12/2003 | Wohlgemuth et al. | 713/151 |
| 2004/0092313 A1 | 5/2004 | Saito et al. | |
| 2004/0224741 A1 | 11/2004 | Jen et al. | |
| 2005/0209002 A1* | 9/2005 | Blythe et al. | 463/42 |
| 2006/0121991 A1* | 6/2006 | Borinik et al. | 463/43 |
| 2006/0287096 A1 | 12/2006 | O'Kelley, II et al. | |
| 2008/0082541 A1* | 4/2008 | Davidson et al. | 707/10 |

FOREIGN PATENT DOCUMENTS

| | | |
|---|---|---|
| EP | 1520608 A2 | 4/2005 |
| EP | 1521469 A2 | 4/2005 |
| EP | 1560104 A1 | 8/2005 |
| JP | 2001-197553 A | 7/2001 |
| JP | 2001-325514 A | 11/2001 |
| JP | 2002-149577 A | 5/2002 |
| JP | 2002-346205 A | 12/2002 |
| JP | 2003-0477778 A | 2/2003 |
| JP | 2003-085102 A | 3/2003 |
| JP | 2005-71002 A | 3/2005 |
| JP | 2005-118543 A | 5/2005 |
| JP | 2005-148935 A | 6/2005 |
| KR | 2004-95704 A | 11/2004 |
| KR | 2005-30854 A | 3/2005 |
| TW | 534830 B | 1/2003 |
| TW | 1227159 B | 1/2005 |
| TW | 1233562 | 6/2005 |
| WO | WO 2005/026870 A2 | 3/2005 |

OTHER PUBLICATIONS

Minna no Golf Online Kaisetsusho (Everybody's Golf, Online Manual), Sony Computer Entertainment Inc., Dec. 25, 2003, Received by National Center for Industrial Property Information and Training in Japan, pp. 12-13, 44-49.

Virtua Fighter 4 Evolution Perfect Guide, 1st Edition, Softbank Publishing Inc., Oct. 4, 2002, ISBN 4-7973-2182-2, p. 008.

Japanese Office Action Oct. 31, 2005 (JP2005-256819; Sep. 5, 2005).

International Search Report PCT/JP2006/317276.

Office Action dated Mar. 22, 2010 for Korean Patent Application No. 10-2008-7008140, 10 pages.

Office Action dated Oct. 31, 2006 for Japanese Patent Application No. 2005-256819, 12 pages.

Taiwanese Office Action issued Mar. 30, 2009.

European Search Report EP06797236 dated Jun. 25, 2009, 7 pages.

European Search Report EP06797236 dated Jul. 2, 2009, 7 pages.

* cited by examiner

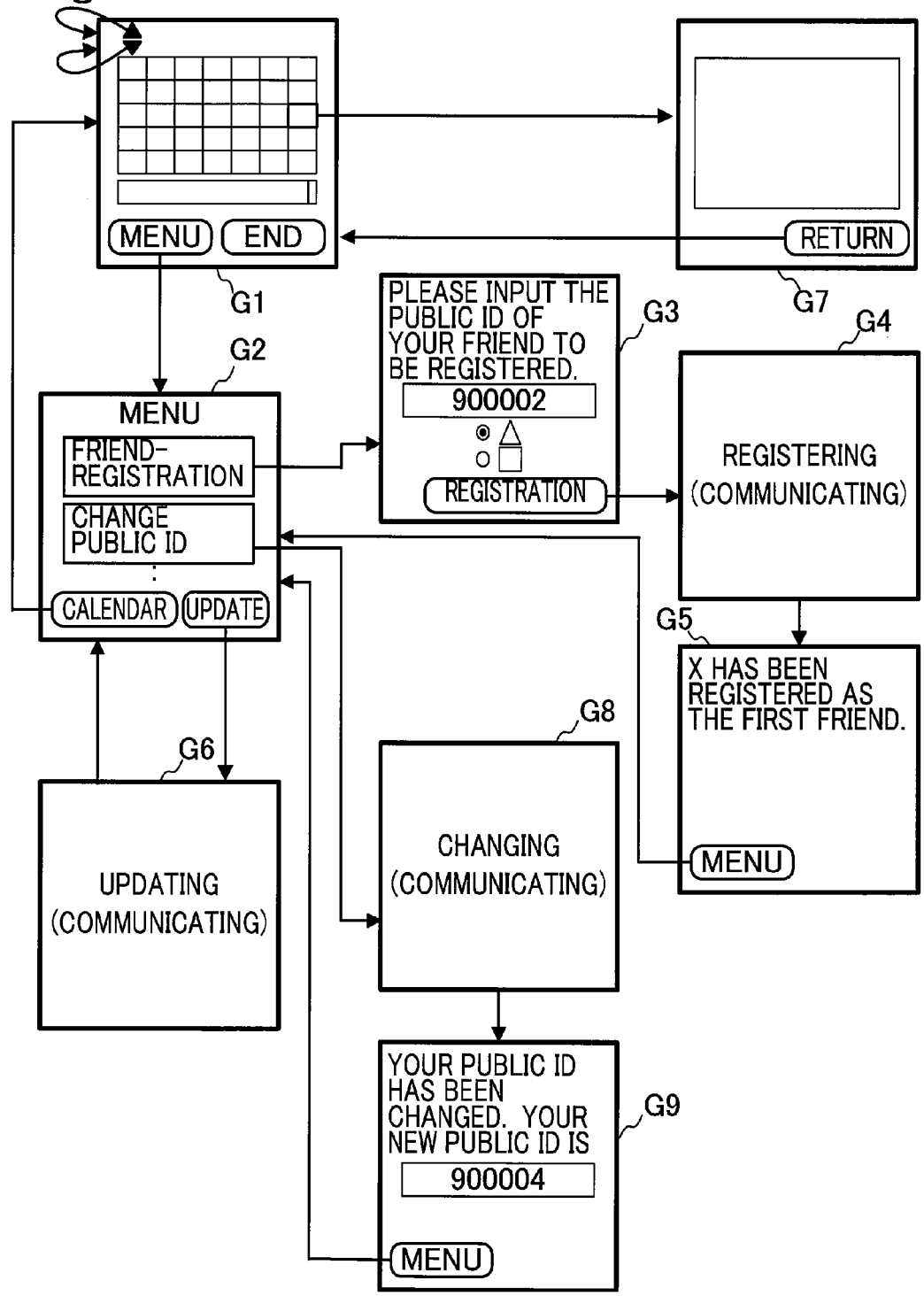

Fig. 19

```
2005  3  MAR  16:00
On 19 March (Saturday)

Mimi
        Clearing reward medal was the "perfect" medal!
        Personal highest score was 95000 points!
                              :

Bob
                              :
                              :
                              :

Nick
                              :
                              :
                              :

RETURN
```

SERVER APPARATUS AND GAME SYSTEM

TECHNICAL FIELD

The present invention relates to server apparatuses and game systems.

BACKGROUND ART

JP-2005-118543-A discloses a system in which plural game devices, located in game arcades, are connected to a server apparatus via a network. In this system, the server apparatus collects, from the game devices, data indicative of results of plays of a game that players have achieved, generates ranking data, and makes the rankings accessible. Mobile terminals can access the server apparatus to display the player rankings.

DISCLOSURE OF INVENTION

Problems to be Solved by Invention

There are players who would like to know the game playing statuses of their friends. On the other hand, there are also players who would like to inform their respective friends of their respective play statuses, but do not wish for unknown persons to be aware of their respective play statuses. If both the former and the latter are friends, the former may be informed of the latter's play statuses, and the former's wish may be satisfied. Thus, the amusement factor of the game may be improved for the former. However, conventionally, the former can know the latter's play statuses by private notification. For example, the former accompanies the latter and records the date of play by the former, the former observes the latter's personal highest score and notes it with the date of play, or the former hears the latter's date of play and personal highest score. This is not easy.

A solution to this problem is the automation of notification. However, there is no system in which notification among individual players is automated. For example, in the aforementioned system of JP-2005-118543-A, rankings are given so as to be accessible to all players who might participate in the system, and therefore, a player cannot choose persons whom the player would like to inform of the player's play status.

In the aforementioned system of JP-2005-118543-A, since data indicating play statuses of the game are collectively given to the server apparatus, the system may be modified such that the data are transmitted to mobile terminals, whereby notification can be automated. An example of such supposed modification is as follows: A player (first player) informs another player (second player), who would like to know the first player's play status, of the first player's identifier. Next, the second player registers the first player's identifier with the server apparatus in such a manner that the first player's identifier is linked with the second player. Thereafter, the server apparatus transmits data indicative of a play status of the first player determined by the registered identifier to the second player's mobile terminal that is linked to the identifier in registration.

However, there is the possibility that players' intention as to permission of play statuses is changed. For example, even if a first player informs a second player of the player's identifier to permit data transmission to the second player, the first player may wish to stop the data transmission afterward. It is thought that change of the identifier of the first player can realize the stop of the data transmission. However, if such a change were simply conducted, the identifier registered with the server apparatus for data transmission is totally changed, resulting in the server apparatus continuing the data transmission to the second player's mobile terminal. If another design to realize change of the identifier in a more complex manner were considered, such a change would involve various troublesome amounts of attention since identifiers of players are usually utilized in various services provided for players by the system and are associated with various sorts of data.

Otherwise, it is thought that in response to a request from a first player who wishes to stop the data transmission, the server apparatus may invalidate registrations related to the first player's identifier. However, since the first player's identifier remains unchanged, the second player about which the registration has been invalidated can register the first player's identifier with the server apparatus again. In order to invalidate the second registration, the first player should request again, or another new mechanism would be necessary.

Accordingly, it is an object of the present invention to provide a server apparatus and a game system in which notification of statuses of an operation device by a user's manipulation is given to another user, and the notification can be stopped easily according to the user's intention.

Means for Solving the Problems

In the following, a description will be given of the present invention. It is to be noted that reference numerals in the attached drawings are shown in parentheses to facilitate understanding of the present invention, and this does not limit the present invention to embodiments as shown in the drawings.

In order to solve the above problem, the present invention provides a server apparatus (3) that can communicate with each of a plurality of operation devices (1) that can be operated by a plurality of users, respectively, including:

a memory unit (33) including a personal data area (T1, T2, T4) for storing data written therein and a personal relationship data area (T3) for storing data written therein;

a personal data writer (31, 31A, 31B) that writes into the personal data area (T1, T2, T4) public identifiers identifying the plurality of users and operation status data elements indicating statuses of operations on at least one of the operation devices (1), in such a manner that a public identifier for an individual user is associated with an operation status data element indicating a status of operation by the individual user;

a self-public-identifier transmitter (31, 31A, 32) that, upon writing a public identifier into the personal data area (T1, T2, T4), transmits to a user identified by the written public identifier an information element imparting the written public identifier to the user;

a personal relationship data writer (31, 31C) that, upon receiving a public identifier identifying a first user from a second user, writes into the personal relationship data area (T3) the received public identifier for the first user in association with the second user;

a friend-play-history transmitter (31, 31E, 31F, 32) that transmits to the second user an information element indicating an operation status data element of the first user stored in the personal data area (T1, T2, T4) and identified by the public identifier associated with the second user in the personal relationship data area (T3); and a public identifier changer (31, 31G) for changing a public identifier for a user stored in the personal data area (T1, T2, T4) upon receiving a request for changing the public identifier from the user.

The term "operation device" refers to, for example, but is not limited to, a game device by which players can play a game. The term "user" refers to, for example, but is not limited to, a player who plays game on the game device. The expression "writes into . . . area . . . public identifiers (of individual users) . . . and operation status data elements" means writing the public identifier of a user and the operation status data element of the user into the area in such a manner that the public identifier and the operation status data element are associated with the user. The expression "writes into . . . area . . . the received public identifier for the first user in association with the second user" includes, for example, that the public identifier of the first user and the identifier of the second user are associated with each other in the area, and that the public identifier of the first user is written into a region of the area exclusively assigned to the second user.

According to this server apparatus (3), when the operation status data element of the first user is transmitted, destined for the second user, the public identifier of the first user stored in the personal relationship data area is used for indicating the person related to the operation status data element. The public identifier is known to the first user, whereby the first user can inform the second user of the first user's public identifier. On the other hand, upon receiving the request from the first user, the public identifier of the first user stored in the personal data area (not in the personal relationship data area) is changed. Thus, by changing the public identifier in response to the request from the first user, the server apparatus can stop transmission of the first user's operation status data element to the second user.

Each operation status data element of each user is associated with the user, rather than with the user's public identifier. Therefore, the system can be constructed in such a manner that changes of the users' public identifiers do not affect other services.

As described above, by virtue of this server apparatus (3), in the system in which notification of an operation status data element of a user is given to another user, the notification can be stopped easily in accordance with the user's intention.

The public identifiers may be generated at the server apparatus (3) and may be written into the personal data area. However, the public identifiers may be transferred from outside to the server apparatus (3) and then be written into the personal data area. In the latter case, the server apparatus (3) should check that no double assignment of the public identifiers to multiple users has occurred, and should write the public identifiers into the personal data area after the check is completed. In the latter case, the method for transferring the public identifiers that can be determined is not limited. For example, the user may tell a human operator of the server apparatus the user's public identifier by telephone, and the human operator in turn inputs the public identifier into the server apparatus (3).

The present invention provides another server apparatus (3) communicatable with each of a plurality of game devices (1) that can be operated by a plurality of players, respectively, including:

a memory unit (33) including a personal data area (T1, T2, T4) for storing data written therein and a personal relationship data area (T3) for storing data written therein;

a personal data writer (31, 31A, 31B) that writes into the personal data area (T1, T2, T4) nonpublic identifiers identifying the plurality of players, public identifiers identifying the plurality of players, and play status data elements indicating results of plays on at least one of the game devices (1), in such a manner that a nonpublic identifier for an individual player is associated with a public identifier for the individual player and a play status data element indicating a result of play by the individual player;

a self-public-identifier transmitter (31, 31A, 32) that, upon writing a public identifier into the personal data area (T1, T2, T4), transmits to a player identified by the written public identifier the written public identifier;

a personal relationship data writer (31, 31C) that, upon receiving a public identifier identifying a first player from a second player, writes into the personal relationship data area (T3) the received public identifier for the first player in association with a nonpublic or public identifier for the second player;

a friend-play-history transmitter (31, 31E, 31F, 32) that transmits to the second player an information element indicating a play status data element of the first player stored in the personal data area (T1, T2, T4) and identified by the public identifier associated with the nonpublic or public identifier for the second player in the personal relationship data area (T3); and a public identifier changer (31, 31G) for changing a public identifier for a player stored in the personal data area (T1, T2, T4) upon receiving a request for changing the public identifier from the player.

According to this server apparatus (3), in the system in which notification of a play status data element of a player is given to another player, the notification can be stopped easily according to the player's intention for the same reasons as those discussed in conjunction with the above-described server apparatus (3).

Each of the above-mentioned server apparatuses (3) may further include a relationship clearer (31, 31H) that clears a public identifier in the personal relationship data area (T3) that is the same as the public identifier in the personal data area (T1, T2, T4) changed by the public identifier changer (31, 31G). By this arrangement, the server apparatus can eliminate a process for transmitting play status data elements on the basis of the old public identifiers that are updated. Consequently, the server apparatus (3) can eliminate a wasteful process.

The present invention also provides a game system including:

a server apparatus (3) communicatable with each of a plurality of game devices (1) that can be operated by a plurality of players, respectively, and a plurality of terminals (4) communicatable with the server apparatus (3), the server apparatus (3) including:

a memory unit (33) including a personal data area (T1, T2, T4) for storing data written therein and a personal relationship data area (T3) for storing data written therein;

a personal data writer (31, 31A, 31B) that writes into the personal data area (T1, T2, T4) nonpublic identifiers identifying the plurality of players, public identifiers identifying the plurality of players, and play status data elements indicating results of plays on at least one of the game devices (1), in such a manner that a nonpublic identifier for an individual player is associated with a public identifier for the individual player and a play status data element indicating a result of play by the individual player;

a self-public-identifier transmitter (31, 31A, 32) that, upon writing a public identifier into the personal data area (T1, T2, T4), transmits, to a player identified by the written public identifier, the written public identifier;

a personal relationship data writer (31, 31C) that, upon receiving a public identifier identifying a first player from a terminal (4) used by a second player, writes into the personal relationship data area (T3) the received public identifier for the first player in association with a nonpublic or public identifier for the second player;

a friend-play-history transmitter (31, 31E, 31F, 32) that transmits to the terminal (4) used by the second player an information element indicating a play status data element of the first player stored in the personal data area (T1, T2, T4) and identified by the public identifier associated with the nonpublic or public identifier for the second player in the personal relationship data area (T3); and a public identifier changer (31, 31G) for changing a public identifier for a player stored in the personal data area (T1, T2, T4) upon receiving a request for changing the public identifier from a terminal used by the player;

each of the terminals (4) including:

a friend-public-identifier input unit (44) into which a player can input a public identifier for another player;

a friend registration processor (41, 41A) that transmits to the server apparatus (3) the public identifier input into the friend-public-identifier input unit (44);

a receiver (46) that receives information destined for the terminal (4) from the server apparatus (3);

a self-public-identifier-change-instruction input unit (44) into which a player can input an instruction for changing a public identifier for the player; and a public-identifier-change-processor (41, 41E) that, upon inputting the instruction into the self-public-identifier-change-instruction input unit (44), transmits to the server apparatus (3) a request for changing the public identifier for the player.

According to this game system, notification of a play status data element of a player is given to another player, and the notification can be stopped easily according to the player's intention for the same reasons as those discussed in conjunction with the above-described server apparatus (3). In addition, according to this game system, the public identifiers and the play status data elements can be recorded in any suitable region of the personal data area. Therefore, the degree of freedom of services provided by the game system can be enhanced. In addition, according to this game system, the play status data element of a player may be received by a terminal (4) of another player, so that the receiving player can handle the play status data element using the terminal (4). A player can change the public identifier using the player's own terminal (4). Thus, using the player's own terminal (4), a player can determine handling of the player's play status data element or can handle the play status data element of another player.

The present invention provides another game system including:

a plurality of game devices (1) that can be operated by a plurality of players, respectively, and a server apparatus (3) communicatable with each of the game devices (1), each of the game devices (1) including:

a play data generator (11) that generates a play data element indicating a result of a game whenever a player plays on the game device;

a reader (13) that reads a recording medium identifier from an information recording medium (2) of a player used for playing on the game device, the recording medium identifier being recorded in the information recording medium (2) for identifying the information recording medium (2); and a transmitter (11, 17) that transmits the generated play data element together with the read recording medium identifier whenever a player plays using the recording medium (2) of the player;

the server apparatus (3) including:

a memory unit including a personal data area (T1, T2, T4) for storing data written therein and a personal relationship data area (T3) for storing data written therein;

a play status data generator (31) that generates a play status data element for a player on the basis of a play data element whenever a play data element is received together with a recording medium identifier from one of the game devices (1);

a personal data writer (31, 31A, 31B) that writes into the personal data area (T1, T2, T4) the recording medium identifier, the play status data element for the player, and a public identifier identifying the player, in such a manner that the recording medium identifier is associated with the public identifier and the play status data element;

a self-public-identifier transmitter (31, 31A, 32) that, upon writing a public identifier into the personal data area (T1, T2, T4), transmits, to a player identified by the written public identifier, the written public identifier;

a personal relationship data writer (31, 31C) that, upon receiving a public identifier identifying a first player from a second player, writes into the personal relationship data area (T3) the received public identifier for the first player in association with a recording medium identifier for an information recording medium (2) of the second player or a public identifier for the second player;

a friend-play-history transmitter (31, 31E, 31F, 32) that transmits to the second player an information element indicating a play status data element of the first player stored in the personal data area (T1, T2, T4) and identified by the public identifier associated with the recording medium identifier for the information recording medium (2) of the second player or public identifier for the second player in the personal relationship data area (T3); and a public identifier changer (31, 31G) for changing a public identifier for a player stored in the personal data area (T1, T2, T4) upon receiving a request for changing the public identifier from the player.

According to this game system, notification of a play status data element of a player is given to another player, and the notification can be stopped easily due to the player's intention for the same reasons as those discussed in conjunction with the above-described server apparatus (3). In addition, according to this game system, the public identifiers and the play status data elements can be recorded in any suitable region of the personal data area. Therefore, the degree of freedom of services provided by the game system can be enhanced. In addition, according to this game system, the game device reads the recording medium identifier from the player's recording medium (2) and transmits the recording medium identifier to the server apparatus, and the server apparatus (3) uses the received recording medium identifier as the aforementioned nonpublic identifier. Thus, it is unnecessary for players to input manually their nonpublic identifier.

In this game system, the recording medium (2) may be a recording medium in which its recording medium identifier is recorded such that rewriting is difficult, or another recording medium in which its recording medium identifier is recorded in an invisible manner. These types of recording mediums are advantageous because unauthorized access can be avoided. An example of a scheme for invisible recording is magnetic recording. In the following description of embodiments of the present invention, a game system is defined as a system including the server apparatus and the terminals in order to avoid confusion. However, as mentioned above, the game system may include the server apparatus and a plurality of game devices.

In each of the above-mentioned game systems, the server apparatus (3) further includes an relationship clearer (31, 31H) that clears a public identifier in the personal relationship data area (T3) that is the same as the public identifier in the personal data area (T1, T2, T4) changed by the public identifier changer (31, 31G). Consequently, the server apparatus (3) can eliminate a wasteful process.

Effects of Invention

In accordance with the present invention, in a system in which notification of statuses of an operation device (such as a game device) resulting from a user's manipulation is given to another user, the notification can be stopped easily according to the user's intention.

BRIEF DESCRIPTION OF DRAWINGS

FIG. 8 is a diagram showing transition of pictures in the mobile terminal 4 when a terminal program P is executed;

FIG. 19 is a diagram showing an example of the detailed information picture G7 displayed on the mobile terminal 4;

BEST MODE FOR CARRYING OUT INVENTION

First Embodiment
Structure

Figure 1:
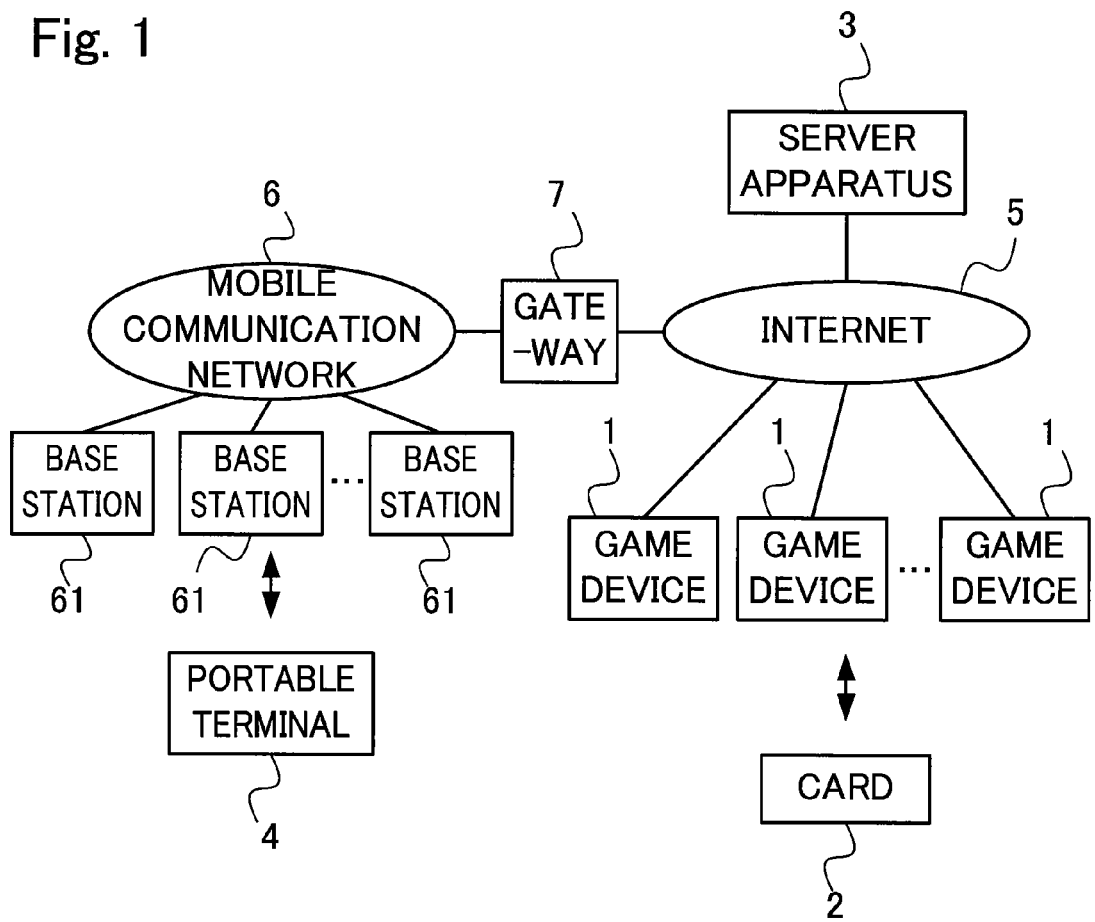
FIG. 1 is a block diagram showing a network system including a game system according to the first embodiment of the present invention.

FIG. 1 is a block diagram showing a network system including a game system according to the first embodiment of the present invention. This network system provides a service in which a number of players can play a predetermined game, and a notification service in which player's are informed of the improvement in their skills in the predetermined game. The network system includes a large number of game devices 1, a large number of cards 2, and the game system. The game system, which provides the notification service, includes a server apparatus 3 and a large number of mobile terminals (terminals) 4.

The game device 1 is an operation device used by players who would like to play the predetermined game. The game device 1 provides a service in which players play the predetermined game at a cost. One or more game devices 1 are located in each of a plurality of game arcades where visitors can use the game devices 1. Players can obtain game results by playing the predetermined game on the game devices 1 in game arcades. Each game device 1 generates play data element indicative of each game result. The game result means an evaluation of one play that the game device 1 has determined, and includes the score of the play at the end of the play.

Each of the cards 2 is a portable recording medium in which information is magnetically recorded, and it stores a card ID (medium identifier) of the corresponding card. The card ID is unique information assigned to a corresponding card 2 and is used for identifying each card 2. The card ID is read by each game device 1 and is reported to the server apparatus 3. However, the card ID is not disclosed to any player at any stage in order to prevent the card ID from being used improperly. Thus, the card ID is a non-disclosed ID for identifying the corresponding card and thus the player possessing the card. In this embodiment, each player possesses a card, but the invention is not intended to be limited to this embodiment. Each player may possess another type of recording medium instead of a card.

There are plural types of cards 2, the types being classified according to different games in which the cards are used. Each player can possess plural types of cards 2. However, in order to enjoy all services provided by this network system, it is necessary to use a card 2 for the predetermined game. In the following description, unless otherwise stated, "card 2" means the card for the predetermined game. Conditions of the cards 2 are classified as "unregistered" or "registered" with the game system. The card ID of the card 2 registered with the game system is managed by the server apparatus 3.

The server apparatus 3 is a computer that collects play data elements and card IDs from a large number of game devices 1, and transmits data on skills about the predetermined game to certain mobile terminals 4. The server apparatus 3 may be a stand-alone computer or may be constituted of a plurality of computers connected via a network. The server apparatus 3 can transmit data to and receive data from each of the game devices 1 via the Internet 5.

Each mobile terminal 4 is a computer owned by a player that receives data from the server apparatus 3 and displays information depending on the data. The mobile terminal 4 serves as a mobile phone that uses a mobile communication network 6, which provides data communication services and telephonic communication services, through one or more of base stations 61. The base stations 61 are located in various places to cover the service area of the mobile communication network 6, and each base station 61 can communicate over the air with a mobile terminal 4 within the cell of the corresponding base station 61. The mobile terminal 4 communicates over the air with one or more base stations 61 in charge of cells where the mobile terminal 4 visits, thereby using the mobile communication network 6. In an alternative embodiment, another type of computer, which does not serve as a mobile phone may be used, or a stationary computer may be used instead of the mobile terminal 4.

The mobile communication network 6 is connected via a gateway 7 with the Internet 5. The gateway 7 translates communication protocols between the mobile communication network 6 and the Internet 5. Thus, the server apparatus 3 can transmit data to and receive data from each of the mobile terminals 4 via the mobile communication network 6 and the Internet 5.

Figure 2:
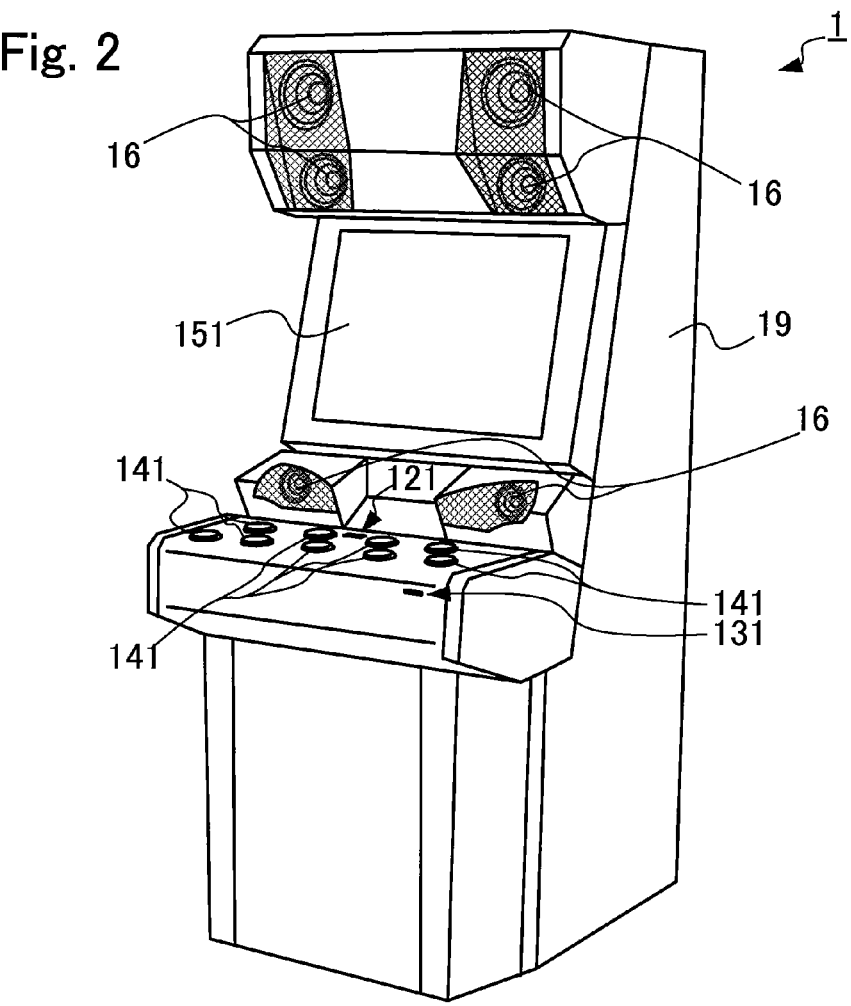
FIG. 2 is a perspective view showing a game device 1 of the network system in FIG. 1.
Figure 3:
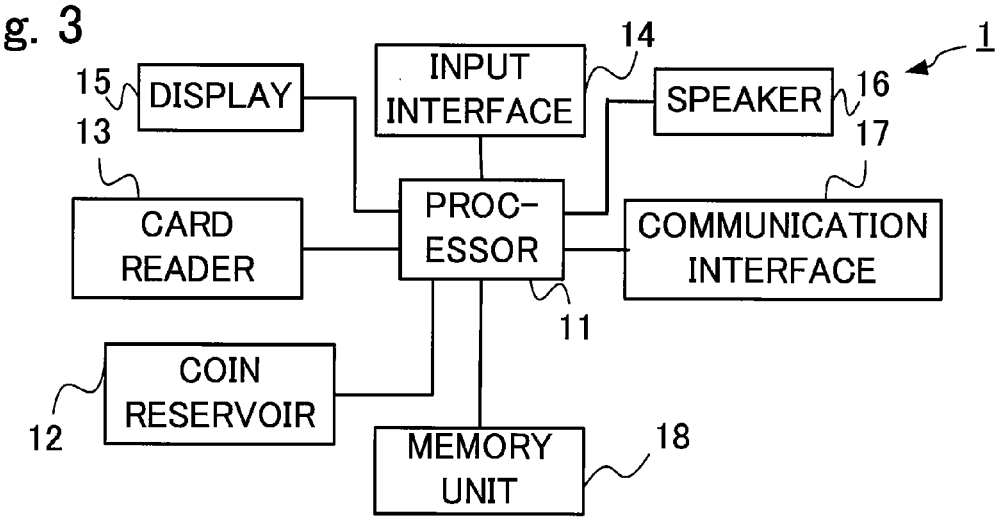
FIG. 3 is a block diagram showing the structure of the game device 1.

FIG. 2 is a perspective view showing one of game devices 1 of the network system, and FIG. 3 is a block diagram showing the structure of the game device 1. As shown in the drawings, the game device 1 includes a processor 11, a coin reservoir 12, a card reader 13, an input interface 14, a display 15, a speaker 16, a communication interface 17 (transmitter), and a memory unit 18.

The coin reservoir 12 discriminates coins deposited through a coin slot 121 formed at the housing 19 of the game device 1, and holds the coins therein if the coins are valid. In addition, if a deposited coin is valid, the coin reservoir 12 supplies a signal indicating that a valid coin has been deposited to the processor 11. One or more valid coins have a value of one play of the predetermined game. The coin is, for example, but is not limited to, a piece of hard currency. The card reader 13 has an opening card slot 131 at the housing 11, reads the card ID from a card 2 when this card 2 is inserted into the card slot 131, and supplies a signal indicating the card ID to the processor 11.

The input interface 14 includes nine actuating elements 141 manipulated by players in plays of the predetermined game, and supplies a signal corresponding to a manipulated element 141 when one of the actuating elements 141 is manipulated. One of the nine actuating elements 141 is used as a start button for starting a play of the predetermined game. The display 15 includes a screen 151 and shows a game picture on the screen 151 in response to image data from the processor 11. The speaker 16 sounds in response to sound signals from the processor 11. The communication interface 17 is connected to the Internet 5 directly or indirectly (via a relay device, e.g., a router), and relays data between the processor 11 and the Internet 5.

The memory unit 18 includes a nonvolatile memory, e.g., a ROM (read only memory) and a rewritable memory, e.g., a RAM (random access memory). Changeable data, such as play data elements and card IDs, are written into the rewritable memory. The nonvolatile memory stores nonchangeable data, such as a game program. By executing this game program in the processor 11, the game device 1 can read the card IDs from a card 2 inserted into the card slot 131, can execute a game process in which a player can play the predetermined game, can transmit various requests, which will be described later, to the server apparatus 3, and can receive various responses, which will be described later, from the server apparatus 3. In the following, the predetermined game will be described.

Figure 4:
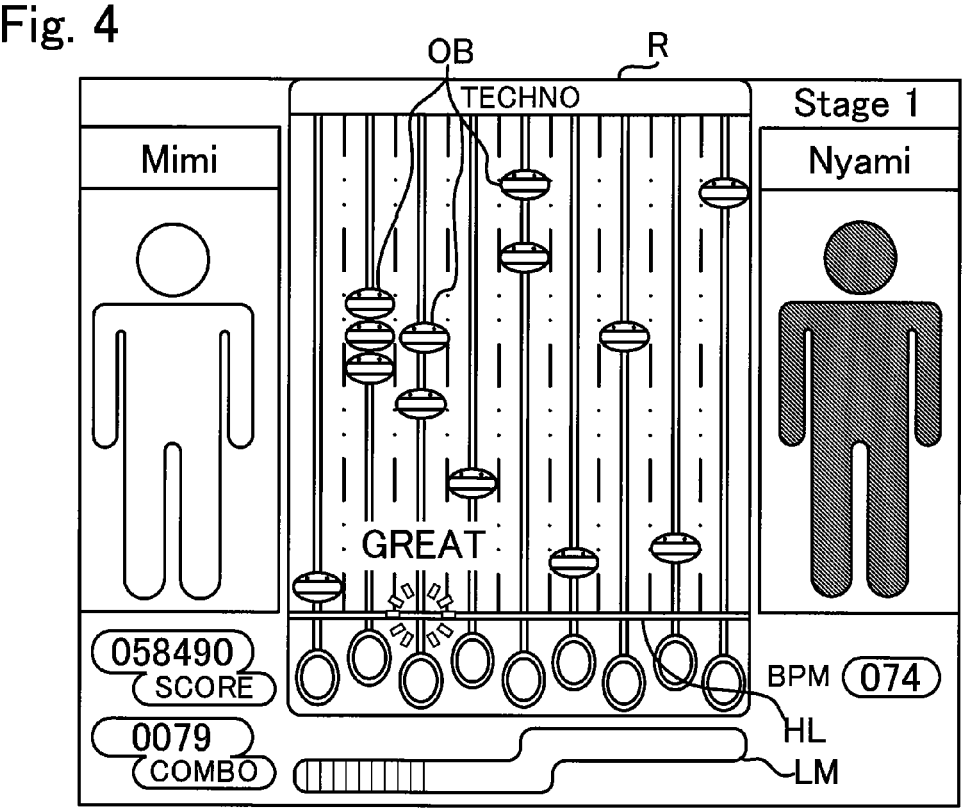
FIG. 4 is an illustration showing an example of game picture displayed on a screen 151 of the game device 1.

FIG. 4 is an illustration showing an example of a game picture displayed on a screen 151 of the game device 1. As shown in FIG. 4, in the central part of the game picture, a game region R is reserved. In the game region R, oval objects OB are displayed, which appear on the top, fall along any of nine perpendicular columns, and disappear at the bottom along a tune (piece of music) selected by the player in advance. The tune is played back and emitted from the speaker 16. There is a horizontal line HL orthogonal to the columns slightly above the section where the objects OB disappear. Below the horizontal line HL, nine images linked to the nine columns are located which represent the nine actuating elements 141, respectively. It is determined that at the instance when an object OB reaches the horizontal line HL, a player shall manipulate one of the actuating elements 141 corresponding to the column along which the object OB is falling. If the precision of this manipulation falls within a predetermined range, the player gains some points.

Below the game picture, images indicative of the score and a level meter LM are displayed. The score is an accumulation of points earned in one play, and increases due to progress of the play. The level meter LM indicates the level of skills in one play by the length of the partial image. The level of skills is a value indicating quality of a play up to the present time, more specifically a statistic of quality of manipulations that have been done up to the present time in one play. The quality of manipulations rises when a manipulation is performed with higher precision, but falls when a manipulation is performed with lower precision.

When playback of a tune ends, a play finishes and the player obtains a game result. The game result includes not only the score of the play that is the score at the end of the play, but also a status of obtaining a clearing reward medal. The clearing reward medal is a virtual reward given to a player who has cleared the predetermined game. The virtual clearing reward medal indicates one of two levels: "PERFECT" which is the best and "NOT BAD" which is the secondary best. The status of obtaining a clearing reward medal includes three patterns: one is giving no clearing reward medal, the second is giving a clearing reward medal indicating "NOT BAD", and the third is giving a clearing reward medal indicating "PERFECT". The pattern is determined on the basis of the level of skills at the end of the play. It is possible that simultaneously with giving clearing reward medals, tangible goods are given to players as prizes.

Figure 5:
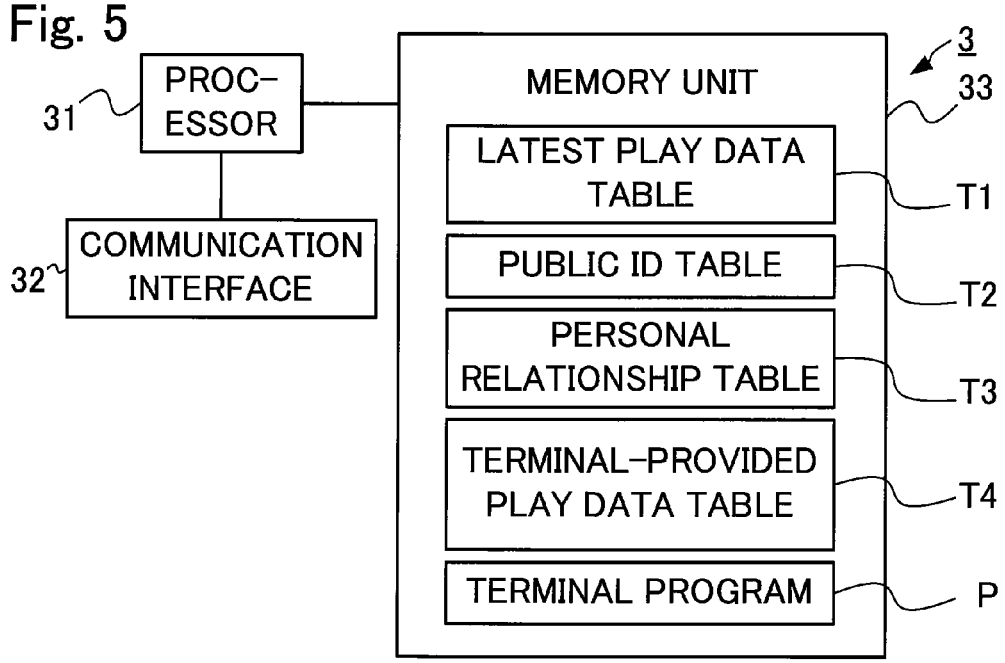
FIG. 5 is a block diagram showing a server apparatus 3 of the network system in FIG. 1.

FIG. 5 is a block diagram showing a server apparatus 3 of the network system. As shown in FIG. 5, the server apparatus 3 includes a processor 31, a communication interface 32 (play data element receiver, friend-registration request receiver, long-period-play-history request receiver, and particular-date-play-history request receiver), and a memory unit 33 (in-server memory unit). The communication interface 32 is connected to the Internet 5 directly or indirectly (via a relay device, e.g., a router), and relays data between the processor 31 and the Internet 5. Although not shown, the memory unit 33 includes a ROM into which an IPL (initial program loader) is written, a RAM which is used as a work area, and a hard disk.

Figure 9A:
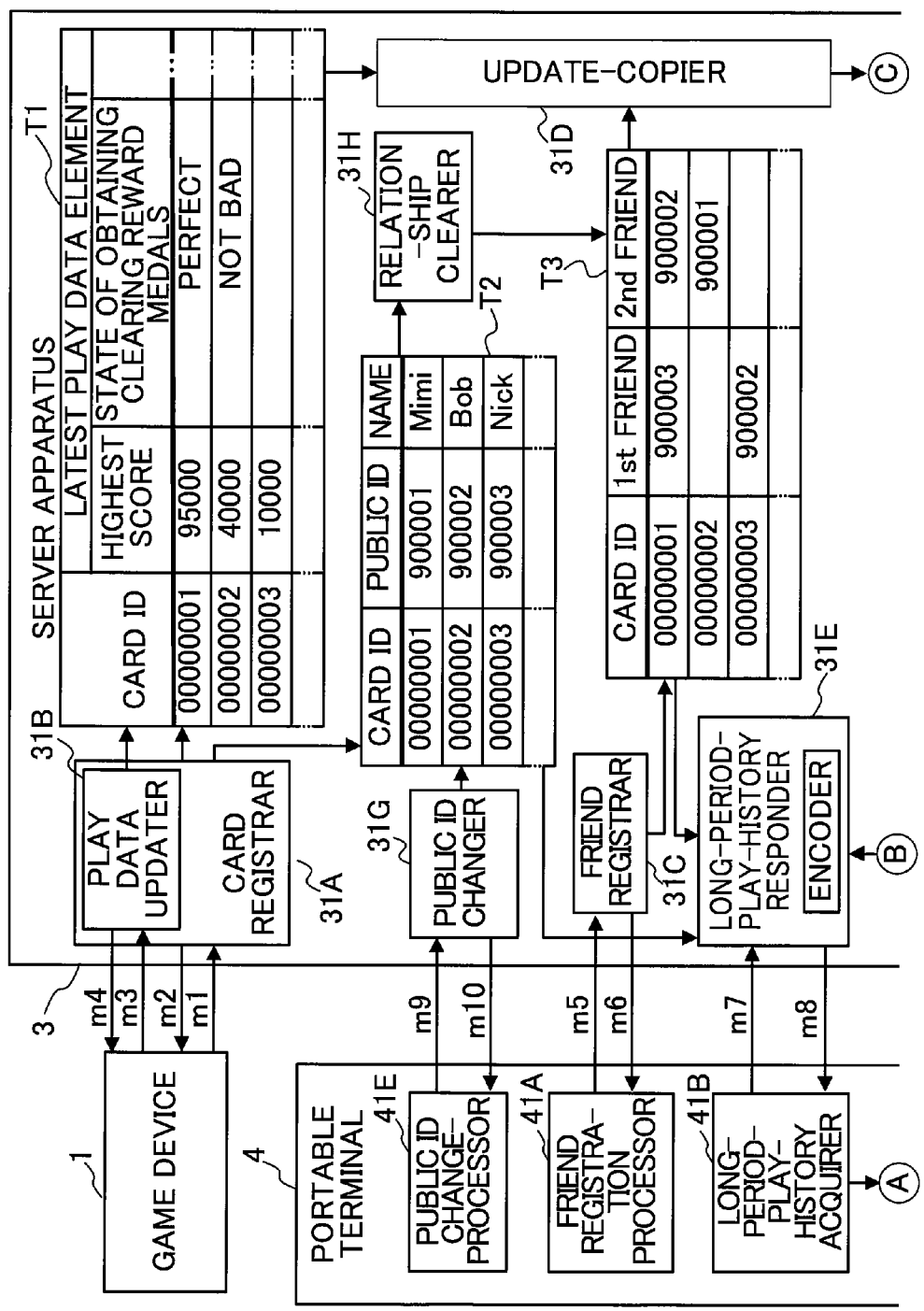
FIGS. 9A and 9B form a diagram showing functions of the network system in FIG. 1, especially functions of the game system.
Figure 9B:
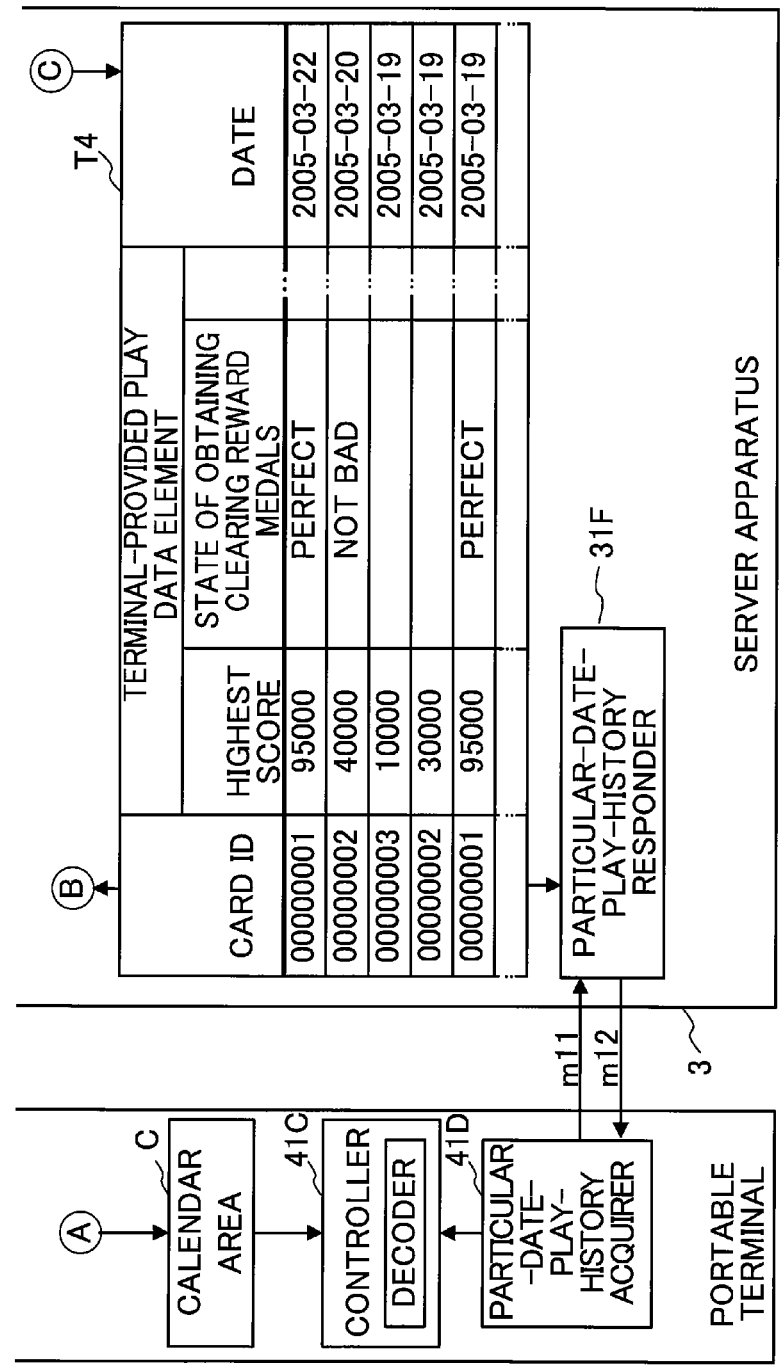

The hard disk reserves a latest play data table T1 (personal data area), a public ID table T2 (personal data area), a personal relationship table T3 (personal relationship data area), and a terminal-provided play data table T4 (personal data area). The hard disk also stores a terminal program P which is installed in the mobile terminal 4 and can be executed on the mobile terminal 4. The terminal program P is a program (computer program product) for causing the mobile terminal 4 to serve as a device for informing players of growth of skills of their friends in the predetermined game. In the hard disk, a management program (not shown) is stored. By executing the IPL, the processor 31 starts executing the management program. By executing the management program at the processor 31, virtual functional blocks including functional blocks shown in FIGS. 9A and 9B are generated in the server apparatus 3.

Figure 6:
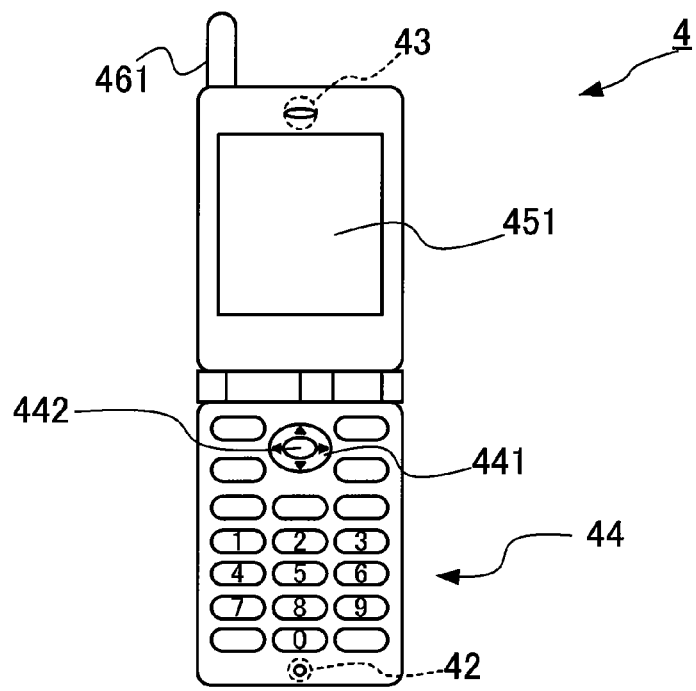
FIG. 6 is a diagram showing the appearance of a mobile terminal 4 of the network system in FIG. 1.
Figure 7:
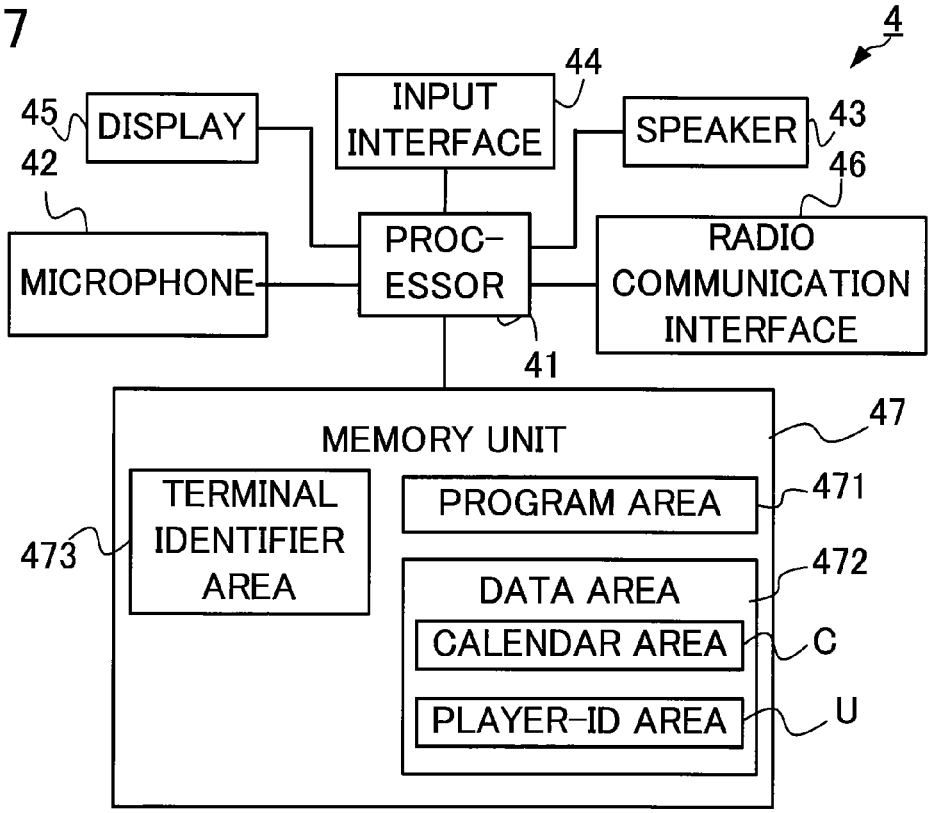
FIG. 7 is a block diagram showing the structure of the mobile terminal 4.

FIG. 6 is a diagram showing the appearance of a mobile terminal 4 of the network system, and FIG. 7 is a block diagram showing the structure of the mobile terminal 4. As shown in these drawings, the mobile terminal 4 includes a processor 41 (memory unit manager), a microphone 42, a speaker 43, an input interface 44, a display 45, a radio communication interface 46 (receiver or in-terminal receiver) and a memory unit 47 (in-terminal memory unit).

The microphone 42 is used for speaking into and supplies signals depending on the user's voice to the processor 41. The speaker 43 is used for producing speech and emits sounds upon receiving voice signals from the processor 41. The input interface 44 includes a plurality of keys manipulated by the user, and it supplies a signal corresponding to a pushed key when one of the keys is pushed. The display 45 includes a screen 451 and shows a picture on the screen 451 in response to image data from the processor 41. The radio communication interface 46 includes an antenna 461 for relaying data between the processor 41 and the base station 61. The trunk between the radio communication interface 46 and the base station 61 is a radio trunk.

The memory unit 47 includes a RAM, a ROM and an EEPROM (electrically erasable programmable ROM). In the ROM, an operating system of the mobile terminal 4 which is executed for booting the mobile terminal 4 is stored. The operating system is a program for causing the processor 41 to have various functions, such as functions of telephonic communication, functions of data communication, functions for downloading other programs, and functions for executing the downloaded programs. By means of functions for executing the downloaded programs, the processor 41 can execute the above-mentioned terminal program P, so that virtual functional blocks including functional blocks shown in FIGS. 9A and 9B are generated in the mobile terminal 4.

The EEPROM reserves a program area 471 for storing a downloaded program and a data area 472 corresponding to the program area 471. The processor 41 which is executing the program stored in the program area 471 can access to the data area 472 corresponding to the program. In addition, the memory unit 47 reserves a terminal identifier area 473 storing the terminal identifier inherent to the mobile terminal 4. The terminal identifier is information for identifying each of a large number of mobile terminals 4, for example, but is not limited to the phone number of the corresponding mobile terminal 4.

FIG. 8 is a diagram showing transition of pictures in the mobile terminal 4 when a terminal program P is executed. As shown in FIG. 8, the pictures displayed on the screen 451 may include a cursor that is movable in the pictures and images of manipulatable objects, such as virtual buttons pushed by the user via software. Accordingly, the above-mentioned keys in the input interface 44 include a Move key 441 and a Fix key 442 for pushing buttons in the pictures via software.

Functions

FIGS. 9A and 9B form a diagram showing functions of the network system in FIG. 1, especially functions of the game system. As shown in FIGS. 9A and 9B, the processor 31 of the server apparatus 3 serves as a card registrar 31A, a play data updater 31B, a friend registrar 31C, an update-copier 31D (terminal-provided data recorder), a long-period-play-history responder 31E (friend-play-history transmitter), a particular-date-play-history responder 31F (friend-play-history transmitter), a public-ID-changer 31G, and a relationship clearer 31H. These functions are also functions of the server apparatus 3, and thus, in the following description, the subjects of operations may be described as the server apparatus 3 instead of the processor 31 for convenience of description.

On the other hand, the processor 41 of the mobile terminal 4 serves as a friend registration processor 41A, a long-period-play-history acquirer 41B, a controller 41C, a particular-date-play-history acquirer 41D, and a public-ID-change-processor 41E. These functions are also functions of the mobile terminal 4, and thus, in the following description, the subjects of operations may be described as the mobile terminal 4 instead of the processor 41 for convenience of description. In the following, these functions and functions of the game device 1 will be described together with an example of use of the network system.

Example of Use

Figure 10A:
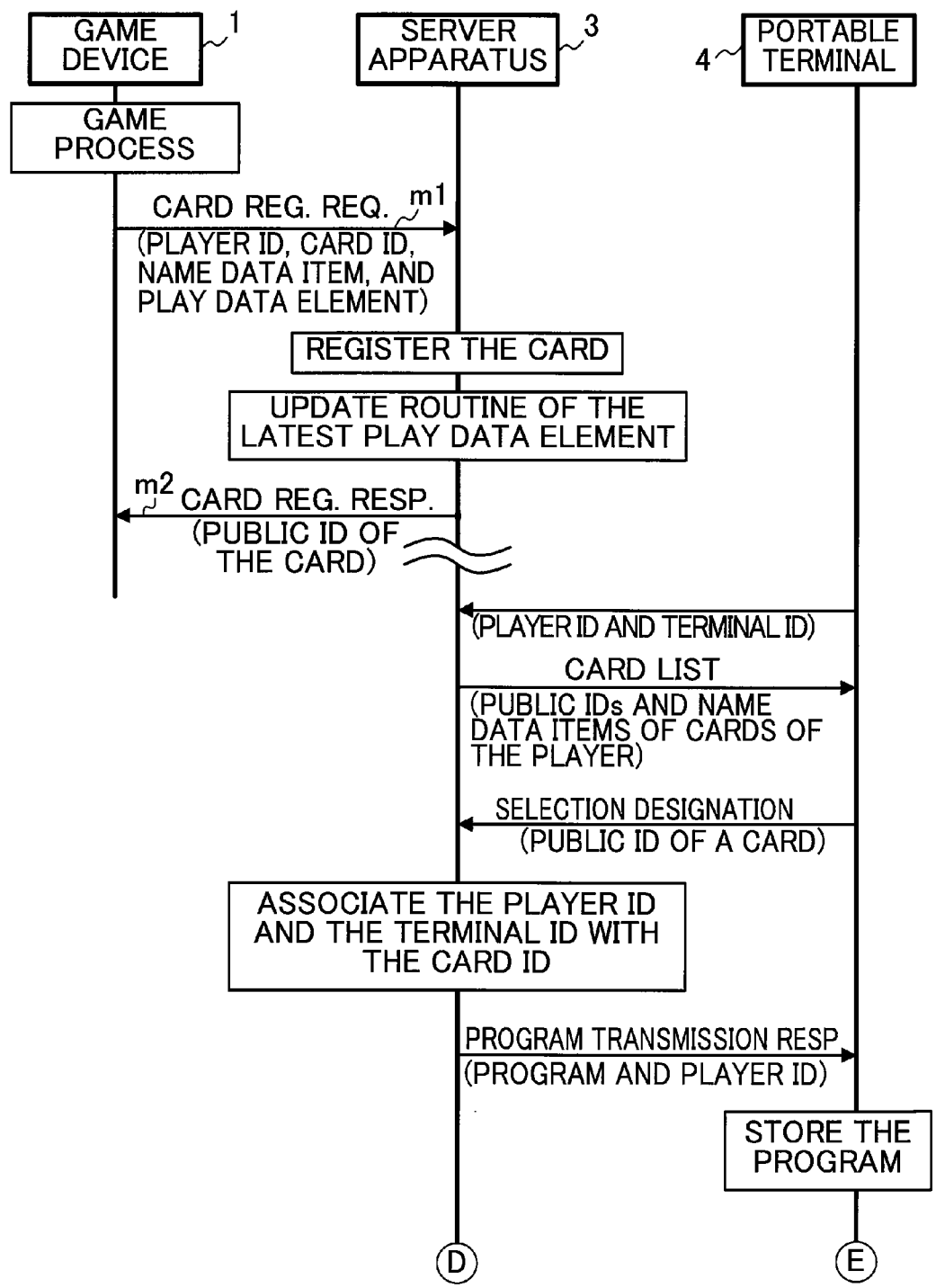
FIGS. 10A and 10B form a diagram showing sequences in an overall operation in an example of use of the network system.
Figure 10B:
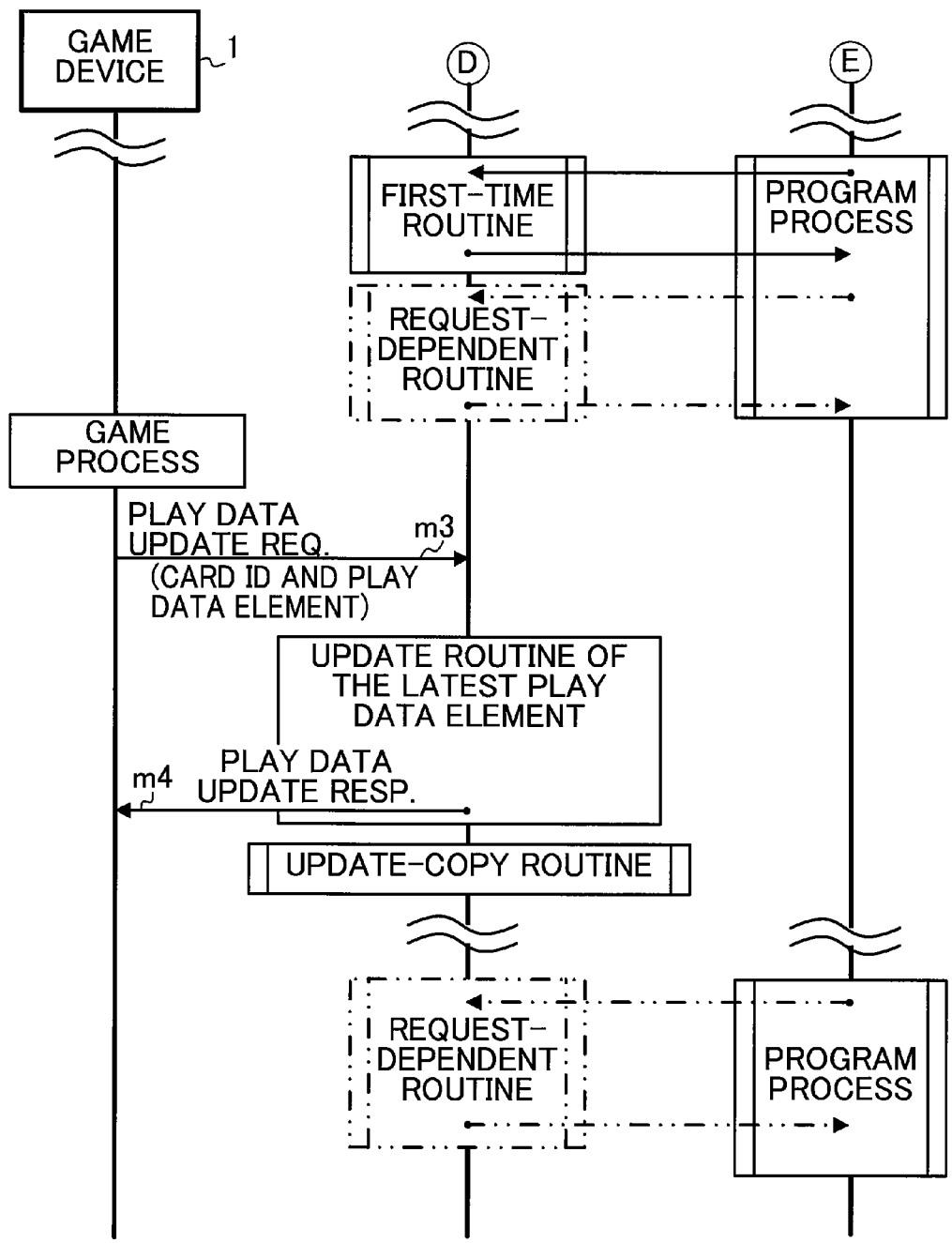

FIGS. 10A and 10B form a diagram showing sequences in an overall operation in an example of use of the network system. As shown in FIGS. 10A and 10B, let us assume that a player (hereinafter referred to as "player A"), using the player's own card 2 that is not registered with the game system, has played the predetermined game on a game device 1. This play starts when the game device 1 starts a game process that is triggered by inserting the card 2 into the card slot 131 of the game device 1 by player A; reading the card ID (for example, "00000001") from the card 2 at the game device 1; recognizing the condition of the card 2 (whether or not the card 2 is registered with the game system) at the game device 1; depositing one or more coins necessary for one play through the coin slot 121 by the player A; and manipulating the start button by the player A.

Once the game process ends, the processor 11 of the game device 1 first serves as a play data generator for generating a play data element indicating a game result of the play, and invites player A to input the player's player ID and the name of the card 2. Next, the processor 11 serves as a transmitter for transmitting a card registration request m1 to the server apparatus 3 through the communication interface 17 (transmitter). The card registration request m1 is a message for requesting the server apparatus 3 to register the card 2 with the server apparatus 3 and to update the latest play data element, which will be described later, corresponding to the card 2. The card registration request m1 includes the player ID input at the game device 1, the card ID read at the game device 1, a name data item indicating the card's name at the game device 1, and the play data element generated at the game device 1.

Player IDs, which are pieces of information associated with and identifying individual players, are assigned to all players who will use the network system, and are managed at the server apparatus 3. It is difficult to rewrite the player ID. The player ID is input at the game device 1, is managed at the server apparatus 3, and is input at the mobile terminal 4, but in no stage is the player ID disclosed to any player other than the corresponding player in order to prevent the player ID from being used improperly.

Upon receiving the card registration request m1 at the communication interface 32 (play data element receiver), the server apparatus 3 first serves as the card registrar 31A (personal data writer) for registering the card 2. More specifically, the card registrar 31A stores the card ID indicated by the card registration request m1 in the memory unit 33 in such a manner that the card ID is associated with the player ID indicated by the card registration request m1. On the other hand, the card registrar 31A generates a public ID (public identifier), and stores the public ID in the public ID table T2 in such a manner that the card ID is associated with the name data item indicated by the card registration request m1. The public ID table T2 stores the public ID and the name data item for each card ID. On the other hand, the card registrar 31A adds a new record into the latest play data table T1, and stores the card ID indicated by the card registration request m1 in a predetermined field of the record. The latest play data table T1 stores the latest play data element for each card ID. Thus, the card 2 is registered with the game system.

The card ID recorded in a card 2, which has been registered with the game system, can be used as an identifier for identifying the player who has the card 2 from among a large number of players by the server apparatus 3. The public ID is, in a manner similar to that of the card ID recorded in a card that has been registered, information for identifying the player to which the public ID is assigned from among a large number of players by the server apparatus 3.

Each record of the latest play data table T1 has a field for recording the latest play data element. The latest play data element (play status data element) indicates the result of a play on one or more game devices 1 by a player, i.e., the skills in the predetermined game by the player. The latest play data element contains a data item indicating the personal highest score that is the highest value among the player's scores of past plays, a data item indicating the status of obtaining clearing reward medals by the player, and a data item indicating the number of plays by the player. The field for recording the latest play data element includes subfields for recording the data items. The status of obtaining clearing reward medals means the best of the past statuses of obtaining clearing reward medals.

Next, the server apparatus 3 serves as a play data updater 31B which is a part of the card registrar 31A, thereby executing an update routine of the latest play data element. This update routine updates the latest play data element corresponding to the card ID indicated by the card registration request m1. First, the server apparatus 3 serves as a play status data generator for generating the latest play data element (play status data element) on the basis of the play data element indicated by the card registration request m1. The term "generate" in this context includes the situation in which the play data element indicated by the card registration request m1 is used in its entirety as the latest play data element. Then, the play data updater 31B writes the latest play data element corresponding to the card ID in the latest play data table T1. In updating based on the card registration request m1, the subfields of the latest play data element are written. At first, the items in the play data element indicated by the card registration request m1 are written into the subfields for recording the personal highest score and for recording the status of obtaining clearing reward medals into each of which nothing has been written, and one is written into the subfield for indicating the number of plays by the player.

Next, the server apparatus 3 serves as a card registrar 31A (self-public-identifier transmitter) for returning a card registration response m2 via the communication interface 32 (self-public-identifier transmitter) to the game device 1. The card registration response m2 is a message indicating that the registration of the card 2 has been completed and the update of the latest play data element corresponding to the card 2 has been completed, and includes the public ID corresponding to the card ID recorded in the card 2. Next, the server apparatus 3 serves as the update-copier 31D for executing an update-copy routine for copying the updating result of the latest play data element into the terminal-provided play data table T4, which will be described later in detail.

Figure 11:
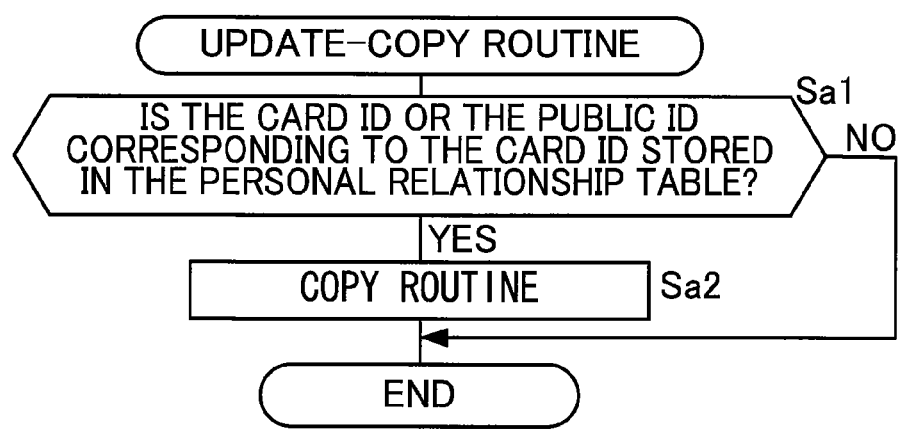
FIG. 11 is a flowchart showing an update-copy routine executed at the server apparatus 3.

FIG. 11 is a flowchart showing an update-copy routine executed at the server apparatus 3. In the update-copy routine as shown in FIG. 11, the server apparatus 3 first determines whether or not the card ID or the public ID corresponding to the card ID is stored in the personal relationship table T3 (step Sa1). The personal relationship table T3 stores the card ID of the registered card 2 owned by the first player and the public ID or public IDs corresponding to the card ID or card IDs of the registered card or cards 2 owned by one or two second players designated by the first player in such a manner that the card ID of the registered card 2 owned by the first player is associated with the public ID or public IDs. In an alternative embodiment, the personal relationship table T3 may store the public identifier of the first player and the public identifier or public identifiers of one or two second players designated by the first player in such a manner that the public identifier of the first player is associated with the public identifier or public identifiers of the one or two second players. At the stage directly after the registration of the card 2 is completed, the determination at step Sa1 is negative, so that the update-copy routine ends without performing any steps.

Upon receiving the card registration response m2, the game device 1 displays images showing the registration of the card 2 has been completed and the public ID indicated by the card registration response m2. Therefore, player A can be aware of the public ID corresponding to the card 2. Then, player A can inform another player who is a friend of player A of the public ID of player A. As will be described later in detail, player A can be aware of the public ID using the mobile terminal 4 at a later stage. Therefore, in an alternative embodiment, the card registration response m2 may not indicate the public ID and the game device 1 does not display the image showing the public ID, but player A can inform another player who is a friend of player A of the public ID of player A.

The above-described process is also performed when player B, who is a friend of player A, has played the predetermined game on a game device 1 using an unregistered card 2 owned by player B, or when player C who is another friend of player A has played the predetermined game on a game device 1 using an unregistered card 2 owned by player C. As a result, as shown in FIG. 9A, three records are made and stored in the latest play data table T1 such that one of the three records respectively corresponds to the three cards 2 owned by players A through C.

On the other hand, player A installs terminal program P on the mobile terminal 4 owned by player A. More specifically, player A manipulates the mobile terminal 4 so that the server apparatus 3 sends the terminal program P to the mobile terminal 4 and the mobile terminal 4 stores the terminal program P in the memory unit 47. At this stage, as shown in FIGS. 10A and 10B, in accordance with manipulation by player A, the mobile terminal 4 sends a program transmission request to the server apparatus 3, in which the program transmission request is a message for requesting transmission of the terminal program P. The program transmission request contains the player ID of player A input by player A and the terminal identifier stored in the terminal identifier area 473 of the memory unit 47. Upon receiving the program transmission request, the server apparatus 3 (self-public-identifier transmitter) returns a card list to the mobile terminal 4 via the communication interface 32 (self-public-identifier transmitter), in which the card list is a list indicating information sets that is related to the player and corresponds to all card IDs (of all cards owned by the player) associated with the player ID indicated by the program transmission request, in which each information set related to the player contains a public ID and a name data item associated with the corresponding card ID. The card list contains a public ID corresponding to another card for a game other than the predetermined game.

Upon receiving the card list, the mobile terminal 4 displays the information sets in the card list, and invites player A to select one information set corresponding to the card 2 for the predetermined game. Accordingly, player A can be aware of the public ID corresponding to the card 2 of player A. Once player A selects a set corresponding to the card 2 by manipulating the mobile terminal 4, the mobile terminal 4 transmits to the server apparatus 3 a selection designation indicating the public ID in the set. Upon receiving this selection designation, the server apparatus 3 stores the card ID corresponding to the public ID indicated by the selection designation and the player ID and the terminal identifier indicated by the program transmission request in such a manner that the card ID is associated with the player ID and the terminal identifier. Then, the server apparatus 3 returns a program transmission response containing the terminal program P and the player ID to the mobile terminal 4. In an alternative embodiment, each information set in the card list may contain a data item indicating the name of the game.

Upon receiving the program transmission response, the mobile terminal 4 stores the terminal program P contained in the program transmission response in the program area 471 of the terminal program P. In addition, the mobile terminal 4 reserves, in the data area 472 corresponding to the program area 471, a calendar area C for storing data such as calendar data elements and a player-ID area U for storing a player ID. Then, the mobile terminal 4 stores the player ID indicated by the program transmission response in the player-ID area U.

After installation of the terminal program P, whenever player A performs a predetermined manipulation, the processor 41 of the mobile terminal 4 reads the terminal program P from the program area 471 and executes the terminal program P. The process conducted at the mobile terminal 4 by executing the terminal program P is referred to as a program process. When the terminal program P is to be executed at the first time in the mobile terminal 4, the server apparatus 3 executes a first-time routine. In addition, upon receiving a request from a mobile terminal 4 which is currently executing the program process, the server apparatus 3 executes a request-dependent routine which depends on the request. The first-time routine and request-dependent routines will be described in detail.

Let us assume now that in the first-time routine, the server apparatus 3 adds a record into the personal relationship table T3 and stores the card ID of the registered card 2 owned by player A in the card ID field of the added record. On the other hand, let us assume now that in one of the request-dependent routines, the server apparatus 3 serves as a friend registrar 31C (personal relationship data writer) for storing the card ID of the registered card 2 owned by player A in the card ID field of the added record, for storing the public ID corresponding to the card ID of the registered card 2 owned by player B in the first friend field of the added record, and for storing the public ID corresponding to the card ID of the registered card 2 owned by player C in the second friend field of the added record. This assumes that player A is informed of the public IDs of players B and C from players B and C.

Next, let us assume that player B has played the predetermined game on a game device 1 using another card 2 owned by player B that is registered with the game system. Once the play ends, the processor 11 of the game device 1 serves as a transmitter for sending an update request m3 to the server apparatus 3 via the communication interface 17 (transmitter), in which the update request m3 is a message for requesting the updating of the latest play data element. The update request m3 contains a play data element generated depending on the play and the card ID of the card 2 owned by player B.

Upon receiving update request m3 at the communication interface 32 (play data element receiver), the server apparatus 3 serves as a play data updater 31B (personal data writer) for executing an update routine of the latest play data element on the basis of the update request m3. First, the processor 31 of the server apparatus 3 serves as a play status data generator for generating a latest play data element (play status data element) on the basis of the play data element in the update request m3. The term "generate" in this context includes the play data element indicated by the update request m3 being used in its entirety as the latest play data element. Then, the play data updater 31B writes the latest play data element into the field of the latest play data element in the latest play data table T1 corresponding to the card ID of the card owned by player B. Consequently, the latest play data element corresponding to the card ID recorded in the card 2 is updated. In updating based on the update request m3, the subfields of the latest play data element are rewritten.

The condition for whether or not rewriting should be conducted is predetermined for each subfield. In this context, the "condition" may include a situation without condition. For example, the personal highest score subfield is rewritten only if the play score indicated by the play data element within the update request exceeds the current personal highest score. In this case, the personal highest score subfield is rewritten to indicate the play score indicated by the update request. For example, the subfield for the status of obtaining clearing reward medals is rewritten only if the status of obtaining a clearing reward medal indicated by the play data element within the update request is better than the current status of obtaining clearing reward medals. In this case, the subfield for the status of obtaining clearing reward medals is rewritten to indicate the status of obtaining a clearing reward medal indicated by the update request. For example, the subfield of the number of plays by the player is rewritten with certainty in the update routine of the latest play data element. The subfield of the number of plays by the player is rewritten to indicate the number of plays which is the current number plus one.

In the update routine, the latest play data element corresponding to the card ID of the card 2 indicated by the update request m3 is updated in the latest play data table T1, and an update response m4 is returned to the game device 1, in which the update response m4 is a message indicating that the update of the latest play data element corresponding to the card 2 has been completed. There is an existing system in which the latest play data element thus updated is used for a service other than the notification service. Consequently, the network system according to the present embodiment can be harmonized with the existing system, and therefore, this embodiment can be implemented simply by adding functions to the existing system.

Upon ending the update routine of the latest play data element, the server apparatus 3 serves as the update-copier 31D for executing the update-copy routine of which the particulars are shown in FIG. 11. If the aforementioned first-time routine has been executed once, the personal relationship table T3 contains a record in which the card ID of the player is recorded, so that the determination at step Sa1 as to whether or not the card ID or the public ID corresponding to the card ID is stored in the personal relationship table T3 is affirmative. Consequently, the server apparatus 3 executes a copy routine (step Sa2) for copying the latest play data element corresponding to the card ID into the terminal-provided play data table T4, and ends the update-copy routine.

The terminal-provided play data table T4 records growth of skills in the predetermined game of respective players possessing cards 2 of which the card IDs or public IDs are stored in the personal relationship table T3. More specifically, the terminal-provided play data table T4 stores the card ID of a card 2, a terminal-provided play data element indicating skills of the player possessing the card 2, and a date data item indicating the date on which the player played, thereby obtaining the terminal-provided play data element, in such a manner that the card ID, the terminal-provided play data element, and the date data item are mutually associated. The terminal-provided play data element is a subset of the latest play data element, and contains a data item indicating the personal highest score, a data item indicating the status of obtaining clearing reward medals, a data item indicating the number of plays, etc. On a request from the mobile terminal 4, the terminal-provided play data elements corresponding to the owner of the mobile terminal 4 and to friends of the owner can be supplied to the mobile terminal 4. As shown in FIGS. 9A and 9B, the latest play data table T1 includes a record for a latest play data element corresponding to a card ID, but the record is not associated with the date data item. However, the terminal-provided play data table T4 includes one or more records for terminal-provided play data elements corresponding to a card ID, and the records are associated with the date data items. Accordingly, the terminal-provided play data elements in the terminal-provided play data table T4 record growth of skills of respective players corresponding to the respective card IDs.

In the aforementioned copy routine (step Sa2), specifically, the server apparatus 3 generates a terminal-provided play data element, which indicates a player's skill, on the basis of the updated latest play data element (i.e., on the basis of the play data element in the card registration request m1 or update request m3). In this context, to "generate" includes the latest play data element being used in its entirety as the terminal-provided play data element. Then, the server apparatus 3 adds a record to the terminal-provided play data table T4, and stores the card ID, the terminal-provided play data element generated on the basis of the latest play data element corresponding to the card ID, and the current date to the added record in such a manner that the card ID, the terminal-provided play data element, and the current date are mutually associated.

As will be apparent from the above description, according to this embodiment, whenever the server apparatus 3 receives, from a game device 1, an update request, the server apparatus 3 executes the update routine of the latest play data element. Furthermore, whenever the server apparatus 3 receives, from a game device 1, an update request, the server apparatus 3 executes the update-copy routine for updating the terminal-provided play data table T4 if the card ID indicated by the update request or the public ID corresponding to the card ID is stored in the personal relationship table T3.

Now, let us assume that player A has performed a manipulation on the mobile terminal 4 of the player A for executing the terminal program P (for executing the program process) on the mobile terminal 4 after the update routine of the latest play data element has been repeated. When the execution of the program process is the second time or more, the server apparatus 3 does not execute the first-time routine. In response to the program process at the mobile terminal 4, the server apparatus 3 executes only request-dependent routines, each of which depends on a request from the mobile terminal 4. In the request-dependent routines, the server apparatus 3 sends the mobile terminal 4 of player A terminal-provided play data elements and date data items corresponding to players B and C, whereby the mobile terminal 4 displays the date on which player B played the predetermined game and an image representing the skill of player B on that date, and displays the date on which player C played the predetermined game and an image representing the skill of player C on that date.

Program Process

Figure 12:
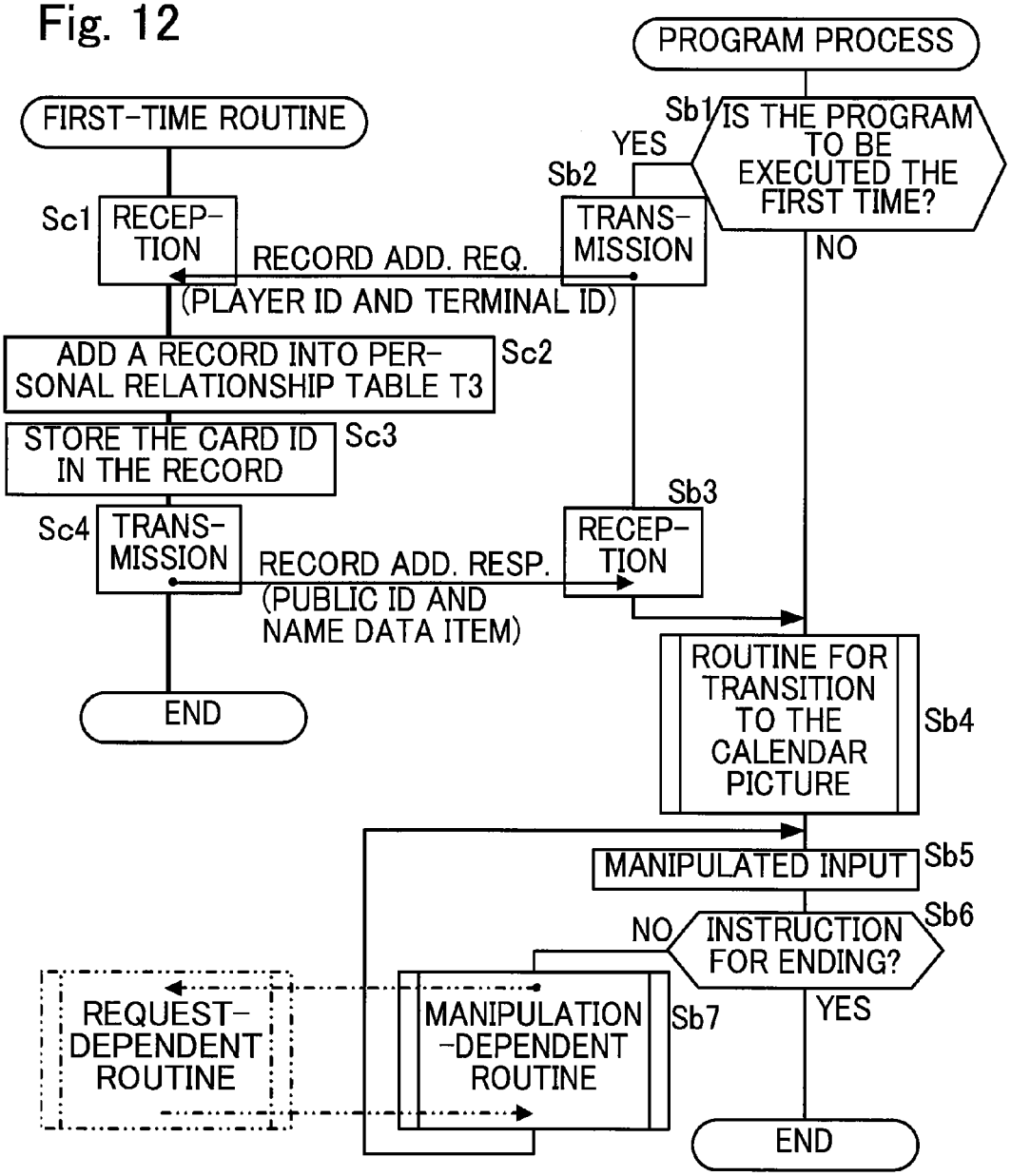
FIG. 12 is a diagram showing a sequence of the program process executed at the mobile terminal 4 and a sequence of the first-time routine that may be executed at the server apparatus 3 in response to the program process.

FIG. 12 is a diagram showing a sequence of the program process executed at the mobile terminal 4 and a sequence of the first-time routine that may be executed at the server apparatus 3 in response to the program process. In the program process as shown in FIG. 12, the mobile terminal 4 determines whether or not the terminal program P is to be executed the first time in the mobile terminal 4 (step Sb1). This determination is enabled by, for example, using a flag in the data area 472, in which the flag is in the on-status directly after installation of the terminal program P and changes to the off-status after this determination is conducted. If the determination is affirmative, the mobile terminal 4 sends the server apparatus 3 a record addition request which is a message for requesting addition of a record into the personal relationship table T3 (step Sb2). The record addition request contains the player ID recorded in the player-ID area U and the terminal identifier recorded in the terminal identifier area 473.

In the first-time routine, upon receiving the record addition request (step Sc1), the server apparatus 3 adds a record into the personal relationship table T3 (step Sc2), and stores the card ID corresponding to the player ID and the terminal identifier indicated by the record addition request in the card ID field of this record (step Sc3). Then, the server apparatus 3 returns a record addition response to the mobile terminal 4, in which the record addition response is a message indicating that the record has been added into the personal relationship table T3 (step Sc4). The record addition response contains the public ID and the name data item that correspond to the card ID.

The mobile terminal 4 receives the record addition response and writes the public ID and the name data item indicated by the record addition response in the data area 472 (step Sb3). Next, the mobile terminal 4 changes the displayed picture on the screen 451 to the calendar picture G1 shown in FIG. 8 (step Sb4). On the other hand, if the determination as to whether or not the terminal program P is to be executed the first time in the mobile terminal 4 is negative, the mobile terminal 4 changes the displayed picture on the screen 451 to the calendar picture G1 shown in FIG. 8 (step Sb4). In an alternative embodiment, the mobile terminal 4 may write the public ID and the name data item corresponding to the owner of the mobile terminal 4 in the data area 472 when the terminal program P is downloaded. In this alternative embodiment, the record addition response may not contain the public ID and the name data item.

Next, the mobile terminal 4 waits for a manipulated input by the owner of the mobile terminal 4 (step Sb5), and determines whether or not the manipulated input is the instruction for ending (step Sb6). If this determination is negative, the mobile terminal 4 executes a manipulation-dependent routine depending on the manipulation (step Sb7). The mobile terminal 4 repeats steps Sb5 through Sb7 until the instruction for ending is input, which results in that the program process ending.

Manipulation-dependent routines vary depending on the input manipulation. Manipulation-dependent routines include a routine for changing the displayed picture to a menu picture G2 simply and routines for transmitting a request to the server apparatus 3 and for receiving a response from the server apparatus 3. In the latter routines, the server apparatus 3 executes a request-dependent routine depending on the request from the mobile terminal 4.

Request-dependent routines in response to manipulation-dependent routines include a friend-registration routine depending on a friend-registration routine, a long-period-play-history response routine depending on a long-period-play-history acquisition routine, a particular-date-play-history response routine depending on a particular-date-play-history acquisition routine, and a public-ID-change routine depending on a public-ID-change request routine. In the following, these routines and the routine for transitioning to the calendar picture G1 will be described in detail.

Friend-Registration

Figure 13:
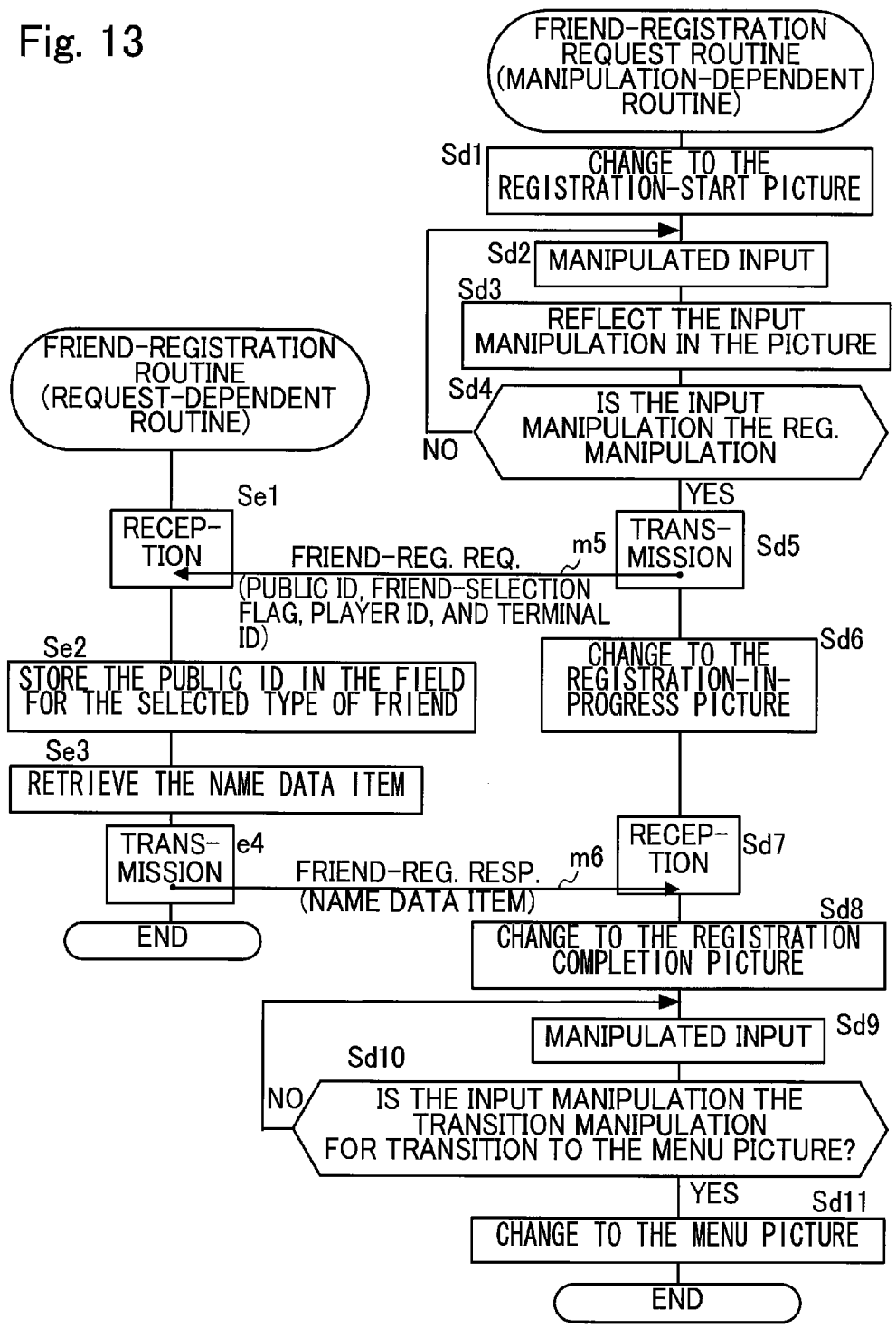
FIG. 13 is a diagram showing a sequence of a friend-registration request routine performed on the mobile terminal 4 and a sequence of a friend-registration routine performed on the server apparatus 3.

FIG. 13 is a diagram showing a sequence of a friend-registration request routine performed on the mobile terminal 4 and a sequence of a friend-registration routine performed on the server apparatus 3. The mobile terminal 4 performs the friend-registration request routine when a manipulated input is supplied which indicates that a friend-registration button of the menu picture G2 in FIG. 8 has been pushed. In the friend-registration request routine, the mobile terminal 4 first changes the displayed picture to a registration-start picture G3 that invites selecting a type of friend to be registered (first friend or second friend), inputting the public ID of the friend to be registered, and inputting a registration manipulation (step Sd1).

Next, the mobile terminal 4 waits for a manipulated input on the input interface 44 (friend-public-identifier input unit) by the player (second player) possessing the mobile terminal 4 (step Sd2), reflects the input manipulation in the displayed picture (step Sd3), and determines whether or not the input manipulation is the registration manipulation (step Sd4). If the determination is negative, the routine returns to step Sd2. The mobile terminal 4 repeats steps Sd2 through Sd4 until the determination is affirmative. Other input manipulations during the repetition include the manipulation for inputting the public ID of another player (friend) and manipulation for selecting a type of friend to be registered (first friend or second friend). The above-mentioned registration manipulation is the act for pushing the registration button in the registration-start picture G3.

The repetition ends when the registration manipulation is input. Then, the mobile terminal 4 serves as a friend registration processor 41A for transmitting the server apparatus 3 a friend-registration request m5 that is a message for requesting registration of the friend (step Sd5), and changes the displayed picture to a registration-in-progress picture G4 indicating that the friend is now being registered (step Sd6). The friend-registration request m5 contains a friend-selection flag indicating the selected type of friend, the input public ID of the friend (first player), the player ID of the owner (second player) stored in the player-ID area U, and the terminal identifier stored in the terminal identifier area 473.

In the friend-registration routine at the server apparatus 3, upon receiving the friend-registration request m3 (step Se1) via the communication interface 32 (friend-registration request receiver), the server apparatus 3 serves as a friend registrar 31C for storing the public ID indicated by the friend-registration request m5 in a friend field in one record in the personal relationship table T3, in which the record contains the card ID corresponding to the player ID and the terminal identifier indicated by the friend-registration request m5, and in which the friend field corresponds to the type of friend indicated by the friend-selection flag indicated by the friend-registration request m5 (step Se2). Next, the server apparatus 3 serves as a friend registrar 31C for retrieving the name data item corresponding to the public ID from the public ID table T2 (step Se3), and returns a friend-registration response m6 to the mobile terminal 4 (step Se4). The friend-registration response m6 is a message containing this name data item and indicating that the registration of the friend has been completed. Thus, the friend-registration routine ends.

Upon receiving the friend-registration response m6 (step Sd7), the mobile terminal 4 serves as a friend registration processor 41A for storing the name data item indicated by the friend-registration response m6, the input public ID, and the selected type of friend (first friend or second friend) in the calendar area C in such a manner that the name data item, the public ID, and the selected type of friend are mutually associated. Then, the mobile terminal 4 changes the displayed picture to a registration completion picture G5 which uses the name data item (step Sd8). The registration completion picture G5 contains an image indicating that the card 2 corresponding to the input public ID is registered as a friend belonging to the selected type.

Next, the mobile terminal 4 waits for a manipulated input (step Sd9), and determines whether or not the input manipulation is a transition manipulation for transitioning to the menu picture G2, in which this transition manipulation is the act for pushing the menu button in the registration completion picture G5 (step Sd10). If the determination is negative, the routine returns to step Sd9. The mobile terminal 4 repeats steps Sd9 and Sd10 until the determination is affirmative (the transition manipulation for transitioning to the menu picture G2 is input.). Then, the mobile terminal 4 changes the displayed picture to the menu picture G2 (step Sd11). The friend-registration request routine thus ends.

Long-Period-Play-History Acquisition

Figure 14:
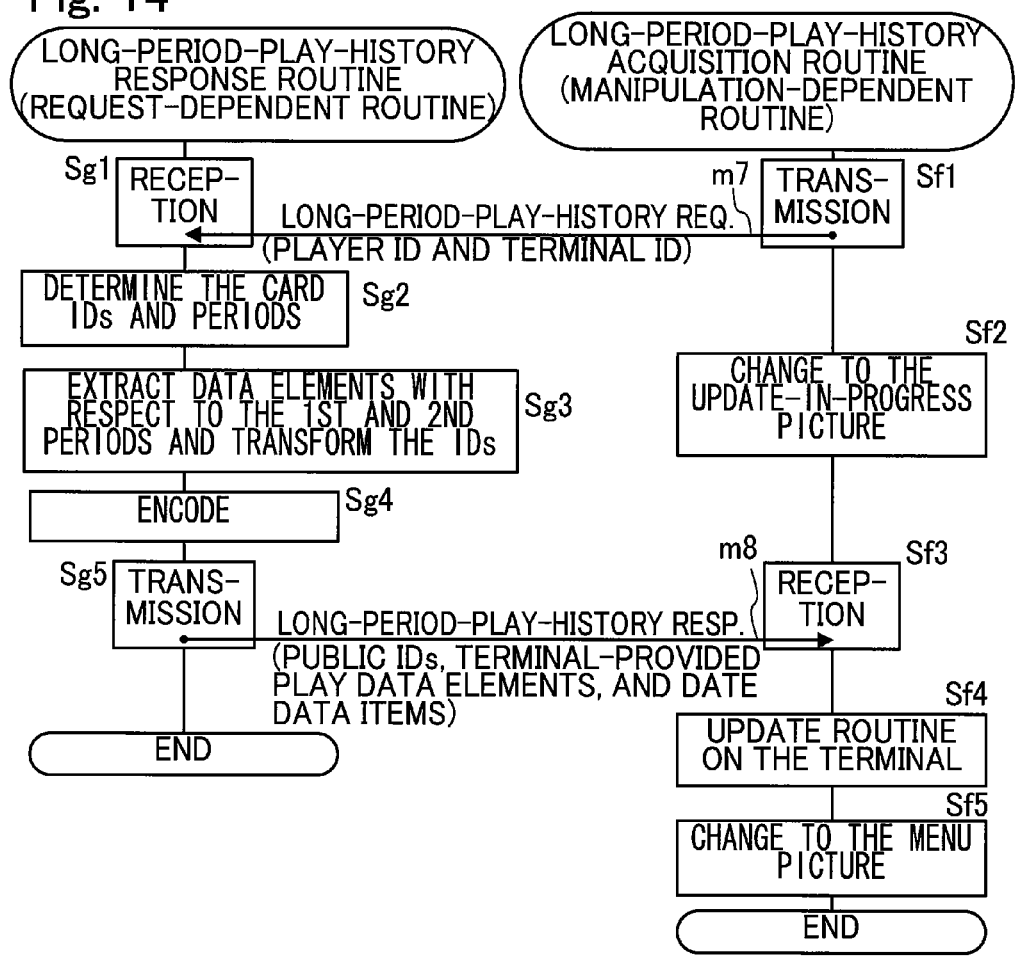
FIG. 14 is a diagram showing a sequence of a long-period-play-history acquisition routine performed on the mobile terminal 4 and a sequence of a long-period-play-history response routine performed on the server apparatus 3.

FIG. 14 is a diagram showing a sequence of a long-period-play-history acquisition routine performed on the mobile terminal 4 and a sequence of a long-period-play-history response routine performed on the server apparatus 3. In the long-period-play-history acquisition routine and the long-period-play-history acquisition routine, terminal-provided play data elements of the owner of the mobile terminal 4 and of one or two friends of the owner generated during a shorter period of a predetermined length (which will be referred to as the second period) and the date data items related to the dates on which they played are supplied to the mobile terminal 4, so that the owner of the mobile terminal 4 can see the progress of the owner and the friends. Furthermore, in the long-period-play-history acquisition routine and the long-period-play-history acquisition routine, the date data items related to the dates on which the owner of the mobile terminal 4 and one or two friends of the owner played during a longer period of a predetermined length (which will be referred to as the first period) are supplied to the mobile terminal 4, so that the owner of the mobile terminal 4 can observe the dates on which the owner and the friends played.

When a manipulated input in which the update button is pushed in the menu picture G2 of FIG. 8, the mobile terminal 4 executes the long-period-play-history acquisition routine. In the long-period-play-history acquisition routine, the mobile terminal 4 first serves as a long-period-play-history acquirer 41B (long-period-play-history request transmitter) for transmitting a long-period-play-history request m7 to the server apparatus 3 via the radio communication interface 46 (long-period-play-history request transmitter) at step Sf1.

The long-period-play-history request m7 is a message for requesting the transmission of calendar data elements, which will be described later. The long-period-play-history request m7 contains the player ID stored in the player-ID area U and the terminal identifier stored in the terminal identifier area 473. Next, the mobile terminal 4 serves as the long-period-play-history acquirer 41B for changing the displayed picture to an update-in-progress picture G6 indicating that updating is in progress (step Sf2).

In the long-period-play-history response routine, upon receiving the long-period-play-history request m7 via the communication interface 32 (long-period-play-history request receiver) at step Sg1, the server apparatus 3 serves as a long-period-play-history responder 31E for determining the card ID (of the owner of the mobile terminal 4) corresponding to the player ID and the terminal identifier indicated by the long-period-play-history request m7, for determining the card ID or card IDs (of one or two other players) corresponding to the public IDs associated with the owner's card ID in the personal relationship table T3, and for determining a selected period including the first period and the second period (step Sg2). The calendar data elements to be transmitted are constituted of data items stored in records of the terminal-provided play data table T4, in which the records include the determined card IDs and date data items indicating dates within the determined selected period. The second period is a predetermined shorter length (for example, 30 days) before the current date until the current date. The first period is a predetermined longer length (for example, one year) before the current date until the current date, but excluding the second period. Thus, the first period is the selected period excluding the second period.

Next, the server apparatus 3 serves as the long-period-play-history responder 31E for extracting the calendar data elements to be transmitted from among the records of the terminal-provided play data table T4, in which the records contain the determined card IDs (of the owner of the mobile terminal 4 and one or two other players) and date data items indicating dates within the determined selected period. Additionally, the long-period-play-history responder 31E transforms the card IDs of the extracted calendar data elements into public IDs (step Sg3). The selections of the calendar data elements are conducted with respect to the first and second periods, respectively. More specifically, from among the records containing the date data items indicating dates within the second period which is shorter and later, the card IDs (of the owner of the mobile terminal 4 and one or two other players), the terminal-provided play data elements corresponding to the card IDs, and the date data items corresponding to the play data elements are extracted so as to constitute the calendar data elements to be transmitted. From among the records containing the date data items indicating dates within the first period which is longer and older, the card IDs (of the owner of the mobile terminal 4 and one or two other players) and the date data items are extracted so as to constitute the calendar data elements to be transmitted.

Next, the server apparatus 3 serves as the long-period-play-history responder 31E, and more specifically serves as an encoder, at step Sg4, for encoding the data to be transmitted that were acquired at step Sg3. This encoding is conducted by replacing the original bit pattern with a shorter bit pattern in accordance with an encoding rule. Thus, the data sequence acquired at step Sg3 is compressed by this encoding. The reason why this encoding is possible is that the data format of the terminal-provided play data elements in the terminal-provided play data table T4, and thus the data format of the latest play data elements in the latest play data table T1 are redundant. The reason why the data formats are redundant is that the data are harmonized with the existing system. Therefore, if it is not necessary to harmonize the data with the existing system, the data format may not be redundant, so that encoding is unnecessary.

Next, the server apparatus 3 serves as the long-period-play-history responder 31E (friend-play-history transmitter) for returning a long-period-play-history response m8 containing the encoded data via the communication interface 32 (friend-play-history transmitter) at step Sg5. The encoded data contained in the long-period-play-history response m8 are called "calendar data elements" because it contains date data items. The returning of the long-period-play-history response m8 is transmission of the calendar data elements. Thus, the long-period-play-history response routine ends. Each calendar data element indicated by the long-period-play-history response m8 is originated from a record of the terminal-provided play data table T4, so that each calendar data element is treated as an individual set at the mobile terminal 4.

Upon receiving the long-period-play-history response m8 (step Sf3), the mobile terminal 4 serves as the long-period-play-history acquirer 41B for updating the calendar data elements in the calendar area C by replacing them with the calendar data elements indicated by the long-period-play-history response m8 (step Sf4). Thus, the calendar data elements in the calendar area C are made newest. Next, the mobile terminal 4 changes the displayed picture to the menu picture G2 (step Sf5). Thus, the long-period-play-history acquisition routine ends.

As described above, in this embodiment, the transmission of calendar data elements is a pull-type transmission triggered by the mobile terminal 4. Only when the user of the mobile terminal 4 would like to see the progress of the user and the friends, the calendar data elements will be transmitted. Therefore, load for transmission can be reduced.

Transitioning to the Calendar Picture

Figure 15:
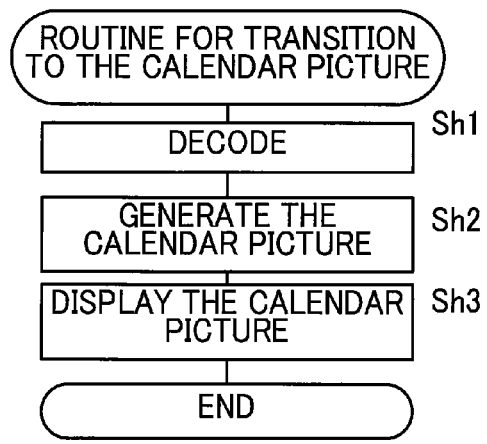
FIG. 15 is a diagram showing a sequence of a routine for transitioning to the calendar picture G1 performed on the mobile terminal 4.

FIG. 15 is a diagram showing a sequence of a routine for transition to the calendar picture G1 performed on the mobile terminal 4. In this transition routine, the owner of the mobile terminal 4 can observe, along with a calendar, information based on the data supplied to the mobile terminal 4 by the long-period-play-history acquisition routine and the long-period-play-history response routine.

In this transition routine, the mobile terminal 4 serves as a decoder for reading, from the calendar area C, the calendar data elements, and for decoding the calendar data elements with a decoding rule relevant to the aforementioned coding rule used in the server apparatus (step Sh1). By this decoding, since the bit pattern of the original encoded data is replaced with a longer bit pattern, the calendar data elements are expanded. Next, the mobile terminal 4 serves as the controller 41C for generating an image necessary for the calendar picture G1 by using the decoded calendar data elements (step Sh2), and for displaying the image, so that the displayed picture changes to the calendar picture G1 (step Sh3).

Figure 16:
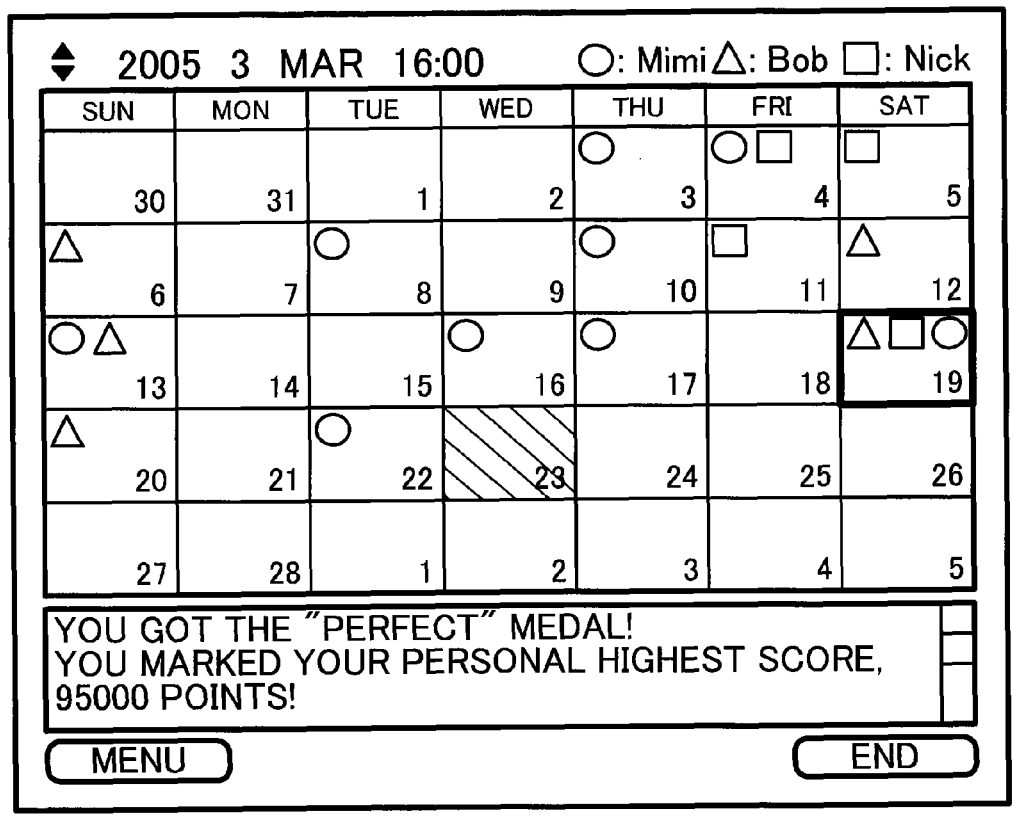
FIG. 16 is a diagram showing an example of the calendar picture G1 displayed on the mobile terminal 4.

FIG. 16 is a diagram showing an example of the calendar picture G1 displayed on the mobile terminal 4. In connection with FIG. 16, let us assume that "today" is 23 Mar. 2005. As shown in FIG. 16, the calendar picture G1 includes characters representing the year and month displayed; characters representing the current time; a table of dates where cells are arranged so as to respectively contain 28 to 31 numbers (days of the month); a text box for scroll-displaying particular information on a play on a selected date achieved by the owner; a menu button for transitioning to the menu picture G2; an end button for ending the program process; a next month button for displaying the table of dates of the next month; a previous month button for displaying the table of dates of the previous month; a cursor used for selecting a particular date, for scrolling the message, and for pushing any one of the buttons; and explanatory notes on displayed icons. The cell corresponding to 23 Mar. 2005 (today) is highlighted. In an alternative embodiment, the architecture of the calendar picture G1 may be altered. For example, the text box and the explanatory notes may be excluded from the calendar picture G1.

The displayed icons include a circular icon representing the owner of the mobile terminal 4, triangular icon representing the first friend, and a square icon representing the second friend. The explanatory notes on the icons depend on the public IDs and the name data items stored in the calendar area C. These icons are arranged in cells in the table of dates in such a manner that each icon corresponding to a public ID is arranged on cells corresponding to date data items stored in the calendar area C, in which the date data items belong to sets containing the public ID. Thus, up to three icons are arranged in each cell.

Figure 17:
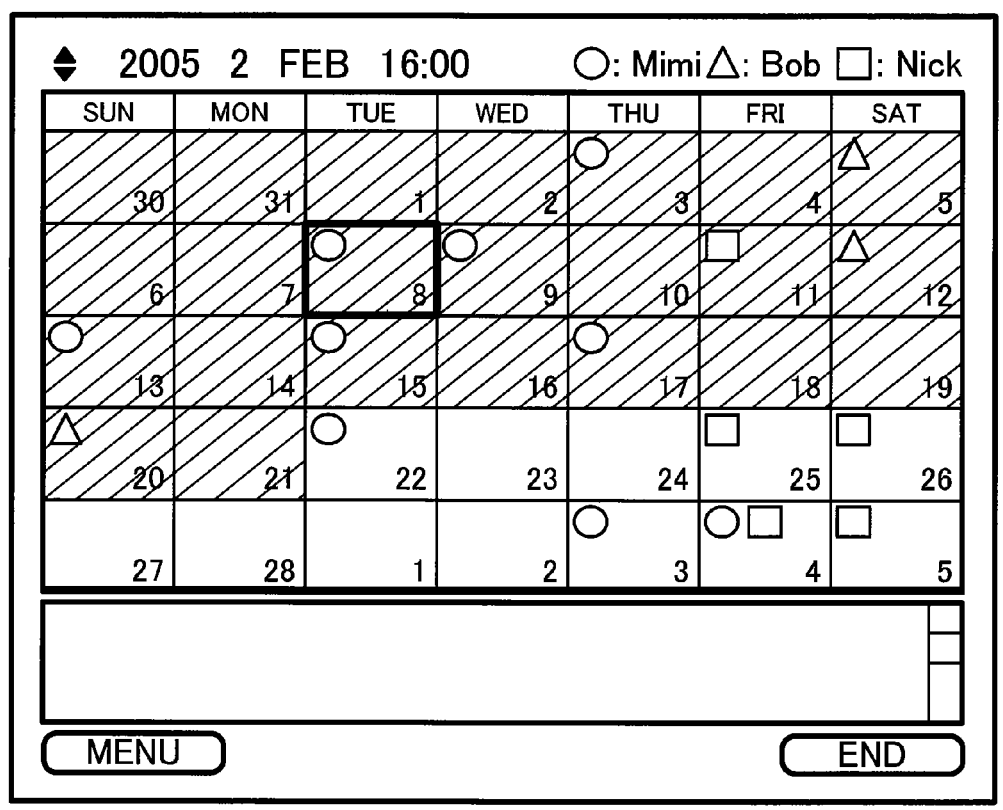
FIG. 17 is a diagram showing another example of the calendar picture G1 displayed when the previous month button is pushed in the calendar picture G1 in FIG. 16.

FIG. 17 is a diagram showing another example of the calendar picture G1 displayed when the previous month button is pushed in the calendar picture G1 in FIG. 16. In FIG. 17, cells have two different appearances (e.g., colors), in which the border between the different appearing areas is the line between 21 Feb. 2005 and 22 Feb. 2005. This assumes that the predetermined length of the shorter period is 30 days, the predetermined length of the longer period is one year, and the latest date on which the long-period-play-history acquisition routine was executed on 22 Mar. 2005. In these calendar pictures G1, the second period begins on 22 Feb. 2005.

In the calendar picture G1 shown in FIG. 16, the cursor is located on the cell corresponding to 19 Mar. 2005. Since this date falls within the second period and an icon representing the owner is located on the cell, the text box scroll-displays particular information (images representing the skill) related to the owner's play on this date. On the other hand, in FIG. 17, the cursor is located on the cell corresponding to 8 Feb. 2005. Although an icon representing the owner is located on this cell, this date does not fall within the second period, so that the text box does not show any particular information on the owner's play on this date. Movement of the cursor is achieved by the Move Key 441 (FIG. 6), so that the Move Key 441 is a date designation unit into which the owner of the mobile terminal 4 can designate a date.

Particular-Date-Play-History Acquisition

Figure 18:
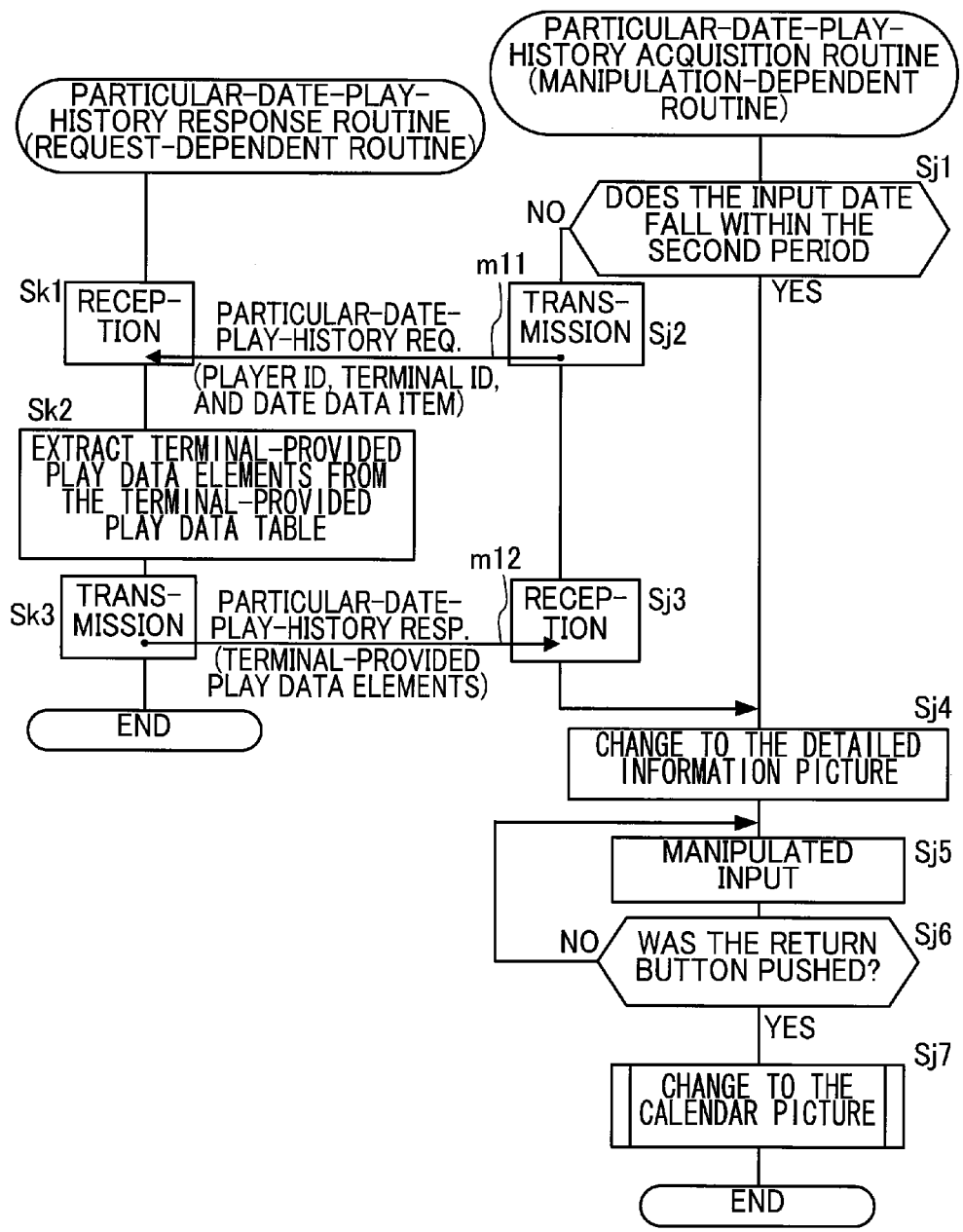
FIG. 18 is a diagram showing a sequence of a particular-date-play-history acquisition routine performed on the mobile terminal 4 and a sequence of a particular-date-play-history response routine performed on the server apparatus 3.

FIG. 18 is a diagram showing a sequence of a particular-date-play-history acquisition routine performed on the mobile terminal 4 and a sequence of a particular-date-play-history response routine performed on the server apparatus 3. In the particular-date-play-history response routine, terminal-provided play data elements in respect to the owner of the mobile terminal 4 and the owner's friend or friends on a particular date are supplied to the mobile terminal 4. In the particular-date-play-history acquisition routine, the owner of the mobile terminal 4 can observe the results of plays by the owner and the owner's friend or friends on that particular date. More specifically, in the particular-date-play-history acquisition routine, information based on terminal-provided play data elements that were acquired in the long-period-play-history acquisition routine and the long-period-play-history response routine and fall within the predetermined shorter period (second period) are promptly displayed on the mobile terminal 4. With reference to longer and older play history about which the date data items were acquired, but about which the terminal-provided play data elements corresponding to the date data items were not acquired in the long-period-play-history acquisition routine and the long-period-play-history response routine, the mobile terminal 4 requests the server apparatus 3 to transmit the terminal-provided play data elements in the particular-date-play-history acquisition routine, and the server apparatus 3 supplies the terminal-provided play data elements to the mobile terminal 4 in the particular-date-play-history response routine.

The mobile terminal 4 executes the particular-date-play-history acquisition routine when a suitable particular date is input. This means that a predetermined manipulated input is made when the cursor is located on a cell of the calendar picture G1 (in FIG. 8) on which at least one icon is located.

In the particular-date-play-history acquisition routine, the mobile terminal 4 first serves as the controller 41C for determining whether or not the input date corresponding to the cell where the cursor is located falls within the second period (step Sj1). Let us assume that the calendar picture G1 at this stage is as shown in FIG. 16, and therefore the determination is affirmative. Then, the mobile terminal 4 serves as the controller 41C for changing the displayed picture to a detailed information picture G7 (step Sj4).

FIG. 19 is a diagram showing an example of the detailed information picture G7 displayed on the mobile terminal 4 corresponding to the calendar picture G1 in FIG. 16. As shown in FIG. 19, the detailed information picture G7 contains an image depending on the terminal-provided play data elements corresponding to the date data items which indicate 19 Mar. 2005. In other words, the mobile terminal 4 displays information on skills in the predetermined game of the players who played on 19 Mar. 2005. The players are the owner, Mimi, and the registered friends, Bob and Nick. As shown in FIG. 16, icons corresponding to all the players are located on the cell corresponding to 19 Mar. 2005 (within the second period), the detailed information picture G7 in FIG. 19 shows information on skills of the three players.

In an alternative embodiment, a detailed information picture G7 may be prepared for each player, whereby the displayed information on skills can be altered one by one. In this embodiment, when a date corresponding to a cell in which plural player icons are located, first the information on the skill of a player is displayed. Then, once one of certain keys (for example, the left key, which is otherwise used for moving the cursor leftward, and the right key, which is otherwise used for moving the cursor rightward) is manipulated, the information on the skill of another player is displayed.

Next, the mobile terminal 4 serves as the controller 41C for waiting for a manipulated input (step Sj5) and for determining whether or not the input manipulation is a transition manipulation for transitioning to the calendar picture G1, in which this transition manipulation is the act of pushing the return button in the detailed information picture G7 (step Sj6). If the determination is negative, the routine returns to step Sj5. The mobile terminal 4 repeats steps Sj5 and Sj6 until the determination is affirmative (the transition manipulation for transitioning to the calendar picture G1 is input.). Then, the mobile terminal 4 serves as the controller 41C for changing the displayed picture to the calendar picture G1 (step Sj7). Thus, the particular-date-play-history acquisition routine ends.

Let us assume that the calendar picture G1 at the determination of step Sj1 is as shown in FIG. 17 and therefore the determination is negative. Then, the mobile terminal 4 serves as a particular-date-play-history acquirer 41D (particular-date-play-history request transmitter) for sending a particular-date-play-history request m11 through the radio communication interface 46 (particular-date-play-history request transmitter) at Sj2. The particular-date-play-history request m11 is a message for requesting to transmit terminal-provided play data elements on one date corresponding to the cell where the cursor is located (in FIG. 17, 8 Feb. 2005 within the first period). The particular-date-play-history request m11 contains the player ID stored in the player-ID area U, the terminal identifier stored in the terminal identifier area 473, and the date data item indicative of the target date.

In the particular-date-play-history response routine, upon receiving the particular-date-play-history request m11 via the communication interface 32 (particular-date-play-history request receiver) at step Sk1, the server apparatus 3 serves as a particular-date-play-history responder 31F for determining the card ID (of the owner of the mobile terminal 4) corresponding to the player ID and the terminal identifier indicated by the particular-date-play-history request m11, for determining the card ID or card IDs (of one or two other players) corresponding to the public IDs associated with the owner's card ID in the personal relationship table T3, and for extracting from the terminal-provided play data table T4 the terminal-provided play data elements corresponding to the determined card IDs (of the owner of the mobile terminal 4 and one or two other players) on the data indicated by the date data item in the particular-date-play-history request m11 (step Sk2).

Next, the server apparatus 3 serves as a particular-date-play-history responder 31F (friend-play-history transmitter) for returning a particular-date-play-history response m12 containing the extracted terminal-provided play data elements via the communication interface 32 (friend-play-history transmitter) at step Sk3. Returning the particular-date-play-history request m11 is transmission of terminal-provided play data elements on the single date. Thus, the particular-date-play-history response routine ends. On the other hand, the mobile terminal 4 serves as the particular-date-play-history acquirer 41D for receiving the particular-date-play-history response m12 (step Sj3). Afterward, the mobile terminal 4 serves as the controller 41C for performing the procedure defined in step Sj4 and the subsequent steps. However, at step Sj4, the detailed information picture G7 will contain images depending on the terminal-provided play data elements indicated by the particular-date-play-history response m12.

By virtue of the above-described particular-date-play-history acquisition routine and the particular-date-play-history response routine, the mobile terminal 4 can receive terminal-provided play data elements falling with the first period which is within the selected period, but excluding the second period. Since the terminal-provided play data elements transmitted are only those on the date designated by the player who is the user of the mobile terminal 4, the transmission load will not increase significantly. Even if the predetermined manipulated input is made when the cursor is located on a cell in which no icon is located, the particular-date-play-history acquisition routine is not executed. Accordingly, this embodiment can avoid wasteful communication and wasteful execution of the particular-date-play-history response routine.

Public ID Change

Figure 20:
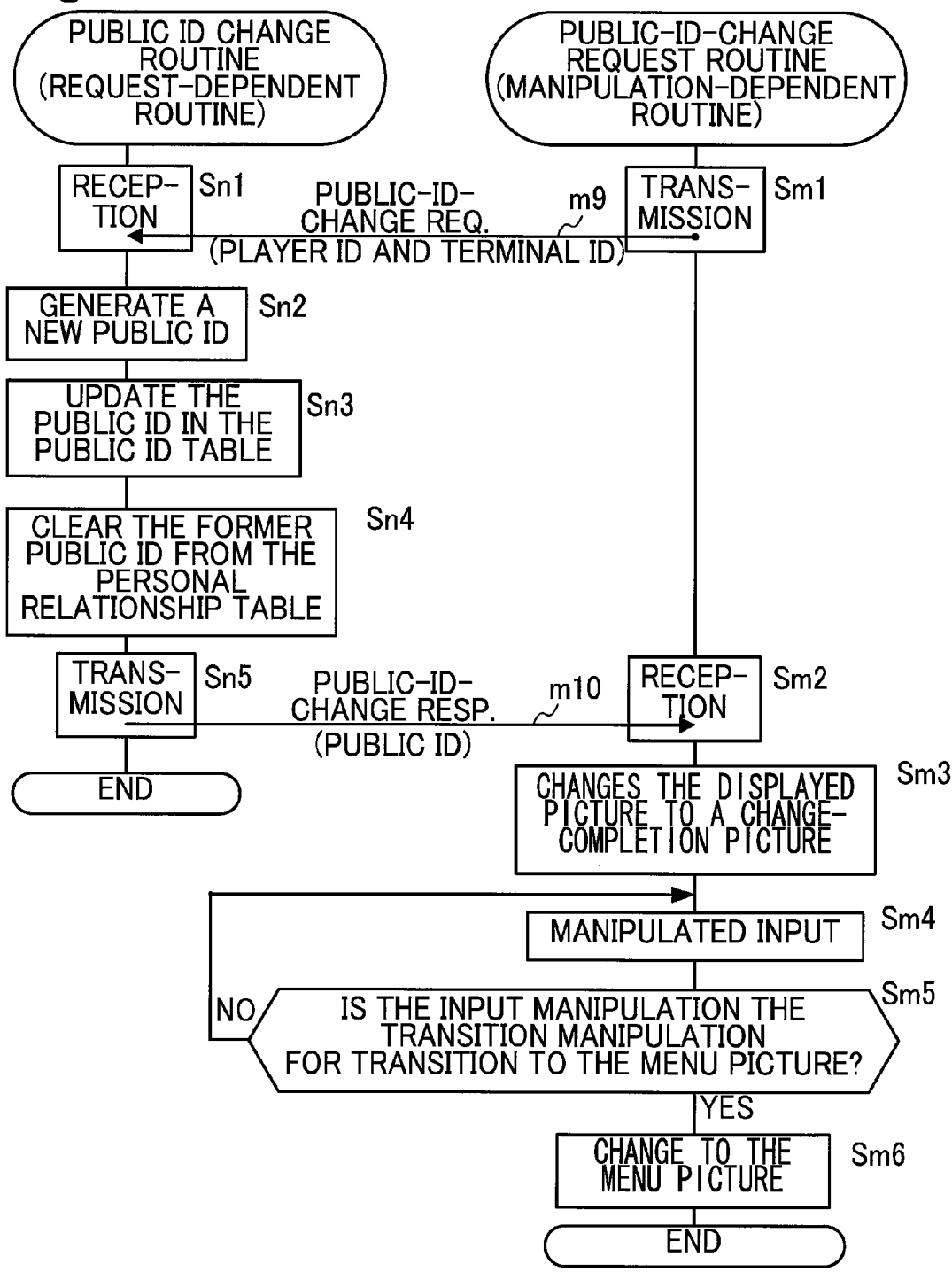
FIG. 20 is a diagram showing a sequence of a public-ID-change request routine performed on the mobile terminal 4 and the public-ID-change routine performed on the server apparatus 3.

FIG. 20 is a diagram showing a sequence of a public-ID-change request routine performed on the mobile terminal 4 and the public-ID-change routine performed on the server apparatus 3. The public-ID-change request routine and the public-ID-change routine enable the owner of the mobile terminal 4 to change the public ID of the owner.

The mobile terminal 4 executes the public-ID-change request routine when the owner of the mobile terminal 4 makes a manipulated input in which the owner pushes a "change public ID" button in the menu picture G2 via software, by using the input interface 44 (self-public-identifier-change-instruction input unit). In the change request routine, the mobile terminal 4 serves as a public-ID-change-processor 41E (public-identifier-change-processor) for sending a public-ID-change request m9 to the server apparatus 3 (step 5 ml). The public-ID-change request m9 is a message for requesting to change the public ID and contains the player ID stored in the player-ID area U and the terminal identifier stored in the terminal identifier area 473.

In the public-ID-change routine, upon receiving the public-ID-change request m9 (step Sn1), the server apparatus 3 serves as a public-ID-changer 31G (public identifier changer) for generating a new public ID (step Sn2). Next, the server apparatus 3 serves as the public-ID-changer 31G for determining the card ID of the owner of the mobile terminal 4 corresponding to the player ID and the terminal identifier indicated by the public-ID-change request m9, and for updating the public ID by replacing the public ID associated in the determined card ID and stored in the public ID table T2 with a new one (step Sn3).

Next, the server apparatus 3 serves as a relationship clearer 31H for clearing the former public ID from the personal relationship table T3 (step Sn4). This results in that the personal relationship table T3 does not have a public ID corresponding to the card ID of the owner of the mobile terminal 4. Afterward, unless the player possessing the card 2 where the card ID is recorded informs other persons of the new public ID personally, data indicating the player's skill will not be transmitted to the mobile terminals of others. Next, the server apparatus 3 serves as the public-ID-changer 31G for returning a public-ID-change response m10, which is a message indicating that the change of the public ID has been completed. The public-ID-change response m10 contains the new public ID.

Upon receiving the public-ID-change response m10, the mobile terminal 4 serves as a public-ID-change-processor 41E for updating the public ID stored in the calendar area C by replacing the former public ID with the new one indicated by the public-ID-change response m10 (step Sm2). Next, the mobile terminal 4 changes the displayed picture to a change-completion picture G9 (step Sm3). This picture includes an image representing the new public ID. Therefore, the user of the mobile terminal 4 can know the new public ID, and further can inform other persons of the new public ID.

Next, the mobile terminal 4 waits for a manipulated input (step Sm4), and determines whether or not the input manipulation is a transition manipulation for transitioning to the menu picture G2, in which this transition manipulation is the act of pushing the menu button in the change-completion picture G9 (step Sm5). If the determination is negative, the routine returns to step Sm4. The mobile terminal 4 repeats steps Sm4 and Sm5 until the determination is affirmative (the transition manipulation for transitioning to the menu picture G2 is input.). Then, the mobile terminal 4 changes the displayed picture to the menu picture G2 (step Sd11). Thus, the public-ID-change request routine ends.

Effects

As will be understood from the above description, the embodiment enables the player who possesses the mobile terminal 4 to estimate the potential skill improvement of the player's friends in the past selected period (for example, the past year) by viewing the locations of the icons. In addition, the player who possesses the mobile terminal 4 can understand the real growth of skills of the player's friends for a second period (for example, the past 30 days). Since the terminal-provided play data elements transmitted to the mobile terminal 4 are only those on dates within the second period in the long-period-play-history acquisition, the transmission load can be reduced in comparison with another envisioned situation in which all terminal-provided play data elements within the selected period are transmitted to the mobile terminal 4.

Furthermore, in this embodiment, easily changeable identifiers are used for identifying a large number of players and are exchanged personally among players for utilizing the notification service. Therefore, each player can easily change the public ID corresponding to the player, thereby securely stopping transmission of the play data elements of the player in the notification service. In addition, each player may inform others of the player's new public ID, so that each player can change the destinations of the play data elements of the player in the notification service.

Second Embodiment

Next, another network system including a game system according to the second embodiment of the present invention will be described. The structure of the network system of the embodiment is similar to that in the first embodiment, except that the terminal program P and the management program stored in the hard disk of the server apparatus 3 are different from those in the first embodiment. Accordingly, some operations of functional blocks virtually generated in the server apparatus 3 and the mobile terminal 4 are different from those in the first embodiment. These differences will be described next.

Figure 21:
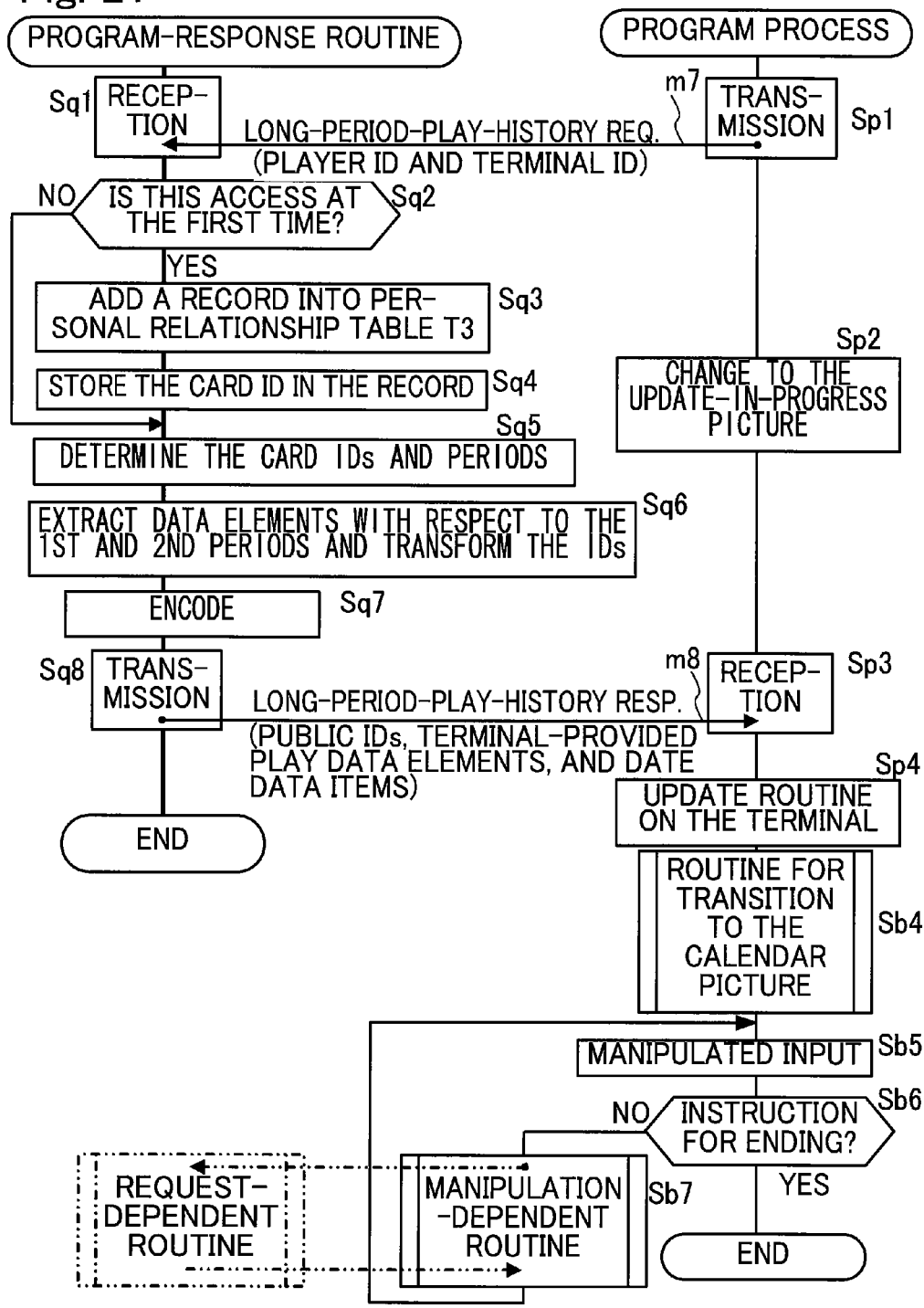
FIG. 21 is a diagram showing a sequence of a program process and a sequence of a program-response routine that may be executed at the server apparatus 3 in response to the program process in a second embodiment of the present invention.

FIG. 21 is a diagram showing a sequence of a program process and a sequence of a program-response routine that may be executed at the server apparatus 3 in response to the program process in this embodiment. In FIG. 21, the same reference symbols are used to indicate similar elements as those shown in FIG. 12. As shown in FIG. 21, in the program process, the mobile terminal 4 serves as a long-period-play-history acquirer 41B for transmitting the long-period-play-history request m7 to the server apparatus 3 without determining whether or not the terminal program P is to be executed the first time in the mobile terminal 4. Next, the mobile terminal 4 changes the displayed picture to the update-in-progress picture G6 (step Sp2).

In the program-response routine, upon receiving the long-period-play-history request m7 at step Sq1, the server apparatus 3 serves as the long-period-play-history responder 31E for determining whether or not this access from the mobile terminal 4 by using the terminal program P is the first time from the mobile terminal 4 (step Sq2). This determination is enabled by, for example, using flags in the memory unit 33, in which flags are dedicated to respective players who use mobile terminals 4, and in which the flag is in the on-status in the initial status and changes to the off-status after this determination is conducted. If the determination is affirmative, the server apparatus 3 adds a record into the personal relationship table T3 (step Sq3), and stores the card ID corresponding to the player ID and the terminal identifier indicated by the long-period-play-history request m7 in the card ID field of this record (step Sq4).

If the determination is negative, the server apparatus 3 serves as the long-period-play-history responder 31E for determining the card ID (of the owner of the mobile terminal 4) corresponding to the player ID and the terminal identifier indicated by the long-period-play-history request m7, for determining the card ID or card IDs (of one or two other players) corresponding to the public IDs associated with the owner's card ID in the personal relationship table T3, and for determining a selected period including the first period and the second period (step Sq5). The selected period is the same as that described above in conjunction with the first embodiment.

Next, the server apparatus 3 serves as the long-period-play-history responder 31E for determining records in the terminal-provided play data table T4, in which the records contain the determined card IDs (of the owner of the mobile terminal 4 and one or two other players) and date data items indicating dates within the determined selected period. The long-period-play-history responder 31E further narrows down the number of records to a predetermined transmittable limit (e.g., ten) in accordance with a predetermined rule if the number of records determined is greater than the predetermined transmittable limit. Then, the long-period-play-history responder 31E extracts the data elements to be transmitted from among the records of the terminal-provided play data table T4. Additionally, the long-period-play-history responder 31E transforms the card IDs of the extracted data elements into public IDs (step Sq6). The selections of the calendar data elements are conducted with respect to the first and second periods, respectively, in manners similar to that of the first embodiment.

The reason for determining whether or not the number of records determined is greater than a prescribed transmittable limit is that there may be a large number of records commonly containing a card ID and a date data item. This is because the copy routine of the update-copy routine (step Sa2 in FIG. 11) is executed under conditions that are different from that in the first embodiment. That is to say, in this embodiment, whenever the update routine of the latest play data element is executed, the copy routine is executed in which the server apparatus 3 serves as an update-copier 31D for adding a record in the terminal-provided play data table T4. Furthermore, since it is in fact difficult to store the extremely large number of records commonly containing a card ID and a date data item, in this embodiment the number of records to be contained is limited to a storable limit (for example, twenty), which is greater than the predetermined transmittable limit.

In contrast to the first embodiment, each latest play data element, which is updated by the update routine, does not contain the data item indicating the number of plays. However, the latest play data according to the second embodiment include not only data elements having data items indicating the highest or the best results throughout all the past as data items indicating skills of players in the predetermined game, but also data elements having data items indicating results of each play (for example, the last play, even though the result is not the highest) and data items indicating the highest or the best results of each day (for example, data items indicating the personal highest scores of each day). Therefore, whenever a card 2 is used for playing the predetermined game, the latest play data corresponding to this card 2 is updated.

Next, the server apparatus 3 serves as an encoder for encoding, at Sq7, the data to be transmitted that were acquired at step Sq6, and serves as the long-period-play-history responder 31E for returning a long-period-play-history response m8 containing the encoded data at step Sq8. This encoding is the same as that described above in conjunction with the first embodiment.

Upon receiving the long-period-play-history response m8 (step Sp3), the mobile terminal 4 serves as the long-period-play-history acquirer 41B for updating the calendar data elements in the calendar area C by replacing them with the calendar data elements indicated by the long-period-play-history response m8 (step Sp4). Thus, the calendar data elements in the calendar area C are made newest. Next, the mobile terminal 4 executes the routine for transitioning to the calendar picture G1 (step Sb4).

Subsequent steps are similar to those described in conjunction with the first embodiment. However, in the second embodiment, the long-period-play-history acquisition routine and the long-period-play-history response routine are the same as the above-described program process and the program-response routine.

The calendar picture G1 displayed in the second embodiment is as shown in FIG. 16. However, even if the previous month button is pushed in this calendar picture G1, the resulting calendar picture G1 does not depict the above-described second period: the cells on or before 21 Feb. 2005 and the cells on or after 22 Feb. 2005 have a common appearance. Even so, this embodiment can avoid wasteful communication and wasteful execution of the particular-date-play-history response routine. The reason will be described next.

Figure 22:
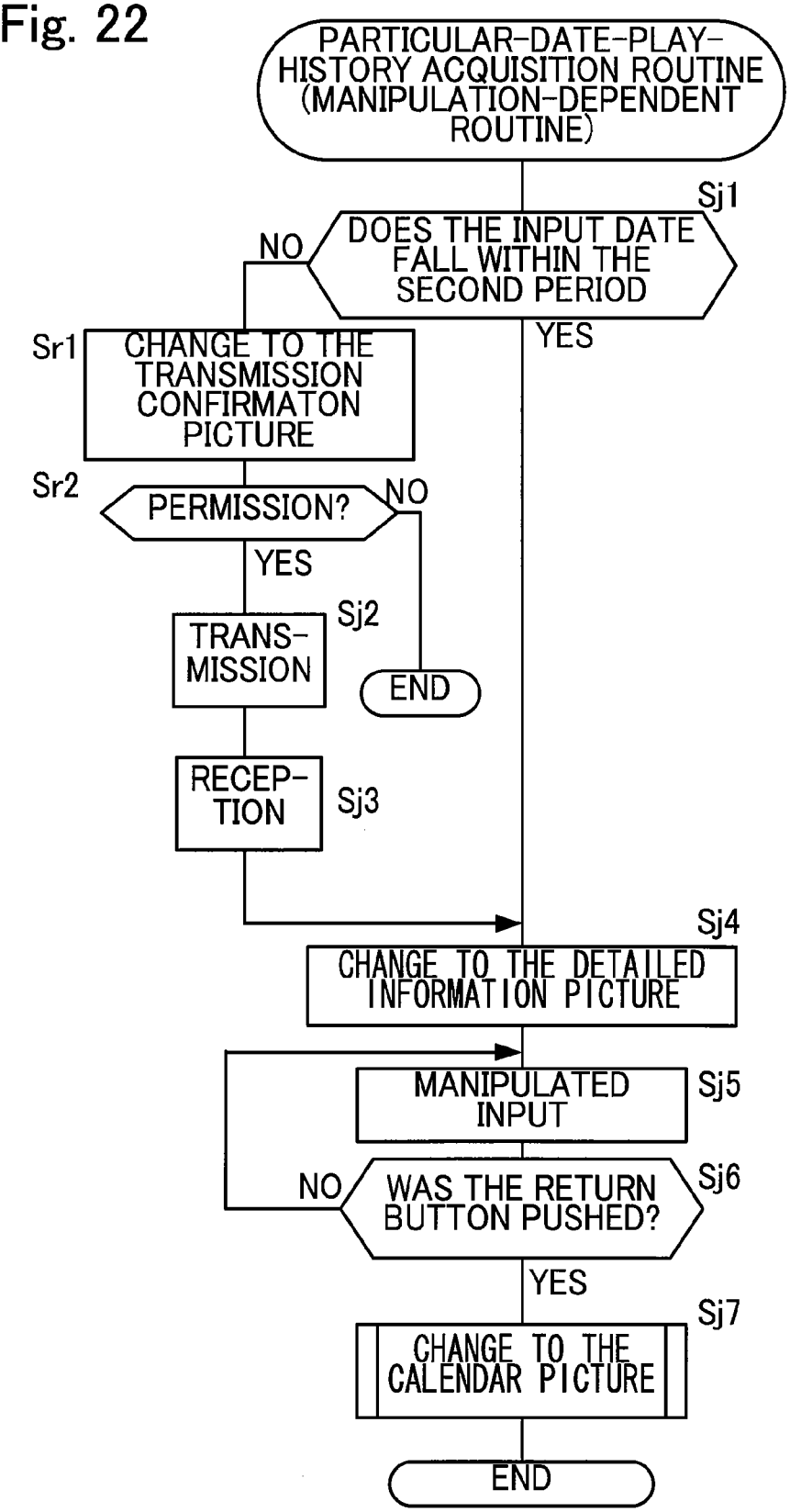
FIG. 22 is a flowchart showing a particular-date-play-history acquisition routine performed on the mobile terminal 4 in accordance with the second embodiment.

FIG. 22 is a flowchart showing a particular-date-play-history acquisition routine performed on the mobile terminal 4 in accordance with the second embodiment. In FIG. 22, the same reference symbols are used to indicate similar elements as those shown in FIG. 18. As shown in FIG. 22, the mobile terminal 4 serves as the controller 41C for determining whether or not the input date corresponding to the cell in which the cursor is located falls within the second period (step Sj1), If the determination is affirmative, the mobile terminal 4 executes the procedure from step Sj4 to Sj7 that is the same as that described in conjunction with the first embodiment. However, the detailed information picture G7 shows information depending on up to ten terminal-provided play data elements for each player. Therefore, it is preferable that a detailed information picture G7 be prepared for each player, whereby the displayed information on skills can be altered one by one.

If the determination at step Sj1 is negative (the input date of the cell in which the cursor is located does not fall within the second period, the mobile terminal 4 serves as the controller 41C for changing the displayed picture to a transmission confirmation picture (not shown) at step Sr1, in which the transmission confirmation picture prompts to input a manipulation which indicates permission or non-permission of transmission of the particular-date-play-history request m11. Next, the mobile terminal 4 serves as the controller 41C for determining whether or not the manipulated input indicating permission of transmission is made (step Sr2). If the manipulated input indicating permission of transmission is made, the mobile terminal 4 executes the procedure defined in step Sj2 and the subsequent steps that is the same as that described in conjunction with the first embodiment. On the other hand, if the manipulated input indicating non-permission is made, the particular-date-play-history acquisition routine ends.

As described above, when a date which does not fall within the second period is designated, the mobile terminal 4 displays the transmission confirmation picture, thereby giving the player an opportunity to designate permission or non-permission of transmission of the particular-date-play-history request m11. In other words, the player is informed that the player has designated a date which does not fall within the second period. The player can permit the transmission only when it is necessary to execute the transmission and the particular-date-play-history response routine. Consequently, even in this embodiment, it is possible to avoid wasteful communication and wasteful execution of the particular-date-play-history response routine.

Additionally, this embodiment can yield various advantages that are the same as those in the first embodiment.

Modifications

In the foregoing, the present invention has been described with reference to embodiments considered currently most practical and preferable. The present invention, however, is not limited to the embodiments disclosed in the specification, and it can be modified appropriately within the gist of the invention or within its scope without departing from the concept understandable from the specification, and it is to be understood that such modifications are also encompassed in the scope of the present invention.

For example, for updating the terminal-provided play data table T4, a terminal-provided play data element may be generated depending on a partial update result of a latest play data element which is the origin of the terminal-provided play data element. For example, if the data item indicative of the personal highest score is updated but the data item indicative of the status of obtaining clearing reward medals is not updated in a latest play data element, a terminal-provided play data element may be generated which does not contain the data item indicative of the status of obtaining clearing reward medals.

In the above-described embodiments, the mobile terminal 4 can display the skill of the player who uses the mobile terminal 4. In a modified embodiment, the mobile terminal 4 may display the skills of only players designated by the player who uses the mobile terminal 4.

In a modified embodiment, the number of friends that a player can register may be one or at least three. If the number of registrable friends is one, it may be possible that terminal-provided play data elements, etc., are transmitted without accompanying the identifiers (e.g., public IDs) that identify a plurality of players.

In the above-described embodiments, the selected period and the second period are reckoned from the date that is one day before the current date. In a modified embodiment, the selected period and the second period are reckoned from the date that is more than one day before the current date.

In the above-described embodiments, in response to the long-period-play-history request from the mobile terminal 4, the server apparatus 3 transmits the terminal-provided play data elements and so on. In a modified embodiment, the server apparatus 3 may transmit the terminal-provided play data elements, etc., at predetermined intervals.

In the above-described embodiments, card IDs recorded in cards 2 are mainly used as identifiers for identifying a plurality of players. It is not intended to limit the invention to the embodiments, and for example, player IDs or terminal identifiers may be mainly used.

In the above-described embodiments, upon receiving the friend-registration request from the mobile terminal 4, the server apparatus 3 executes the friend-registration routine. However, the server apparatus 3 may execute the friend-registration routine upon receiving manipulation by an administrator of the server apparatus 3. For example, the administrator can perform this manipulation upon receiving a telephonic request from a user of a mobile terminal 4.

When a latest play data element with respect to a card 2 is written into the latest play data table T1 for a first time, a data item that indicates the first play for the player may be attached to the corresponding terminal-provided play data element added into the terminal-provided play data table T4.

In the above-described embodiments, in order to harmonize with the existing system, the latest play data table T1 is used. In a modified embodiment, the latest play data table T1 may be excluded. For example, the server apparatus 3 may include a play data element receiver that receives a play data element indicating the result of play of the predetermined game and an identifier (for example, the card ID) that are transmitted from each of a large number of game devices 1 whenever a player plays the predetermined game on any one of the game devices 1, and the server apparatus 3 may generate a terminal-provided play data element directly on the basis of the play data element received at the play data element receiver and may update the terminal-provided play data table T4.

In the above-described embodiments, a game system in which game devices 1 communicate with the server apparatus 3 has been disclosed for illustrative purposes, but it is not intended to limit the present invention to the embodiments including game devices. The present invention can be used for communication between other types of operation devices and a server apparatus, and thus the scope of the present invention encompasses such a game system and such a server apparatus.

The invention claimed is:

1. A server apparatus communicable with each of a plurality of operation devices that is operated by a plurality of users, respectively, comprising:
a memory unit comprising a personal data area for storing data written therein and a personal relationship data area for storing data written therein;
a personal data writer that writes into the personal data area public identifiers identifying the plurality of users and operation status data elements indicating statuses of operations on at least one of the operation devices, in such a manner that a public identifier for an individual user is associated with an operation status data element indicating a status of operation by the individual user;
a self-public-identifier transmitter that transmits to a first user an information element imparting a first public identifier of the first user;
a personal relationship data writer that, upon receiving the first public identifier from the second user, the first public identifier identifying the first user, writes into the personal relationship data area the received first public identifier of the first user in association with the second user;
a transmitter that transmits to the second user an information element indicating an operation status data element of the first user stored in the personal data area and identified by the first public identifier of the first user associated with the second user in the personal relationship data area; and
a public identifier changer for changing the first public identifier of the first user stored in the personal data area upon receiving a request for changing the first public identifier of the first user from the first user,
wherein upon changing the first public identifier for the first user in the personal data area, the public identifier changer transmits to the first user an information element imparting a second public identifier of the first user different from the first public identifier, and wherein the public identifier changer does not update the first public identifier of the first user stored in the personal relationship data area with the second public identifier.

2. The server apparatus according to claim 1, further comprising a relationship clearer that determines whether the first public identifier is stored in the personal relationship data area, upon the first public identifier being changed to the second public identifier by the public identifier changer, and automatically clears the first public identifier in the personal relationship data area.

3. A game system comprising:
a server apparatus communicable with each of a plurality of game devices that is operated by a plurality of players, respectively, and
a plurality of terminals communicable with the server apparatus, each terminal being different from the plurality of game devices, the server apparatus comprising:
a memory unit comprising a personal data area for storing data written therein and a personal relationship data area for storing data written therein;
a personal data writer that writes into the personal data area nonpublic identifiers identifying the plurality of players, public identifiers identifying the plurality of players, and play status data elements indicating results of plays on at least one of the game devices, in such a manner that a nonpublic identifier for an individual player is associated with a public identifier for the individual player and a play status data element indicating a result of play by the individual player;
a self-public-identifier transmitter that transmits to a first player an information element imparting a first public identifier of the first player;
a personal relationship data writer that, upon receiving the first public identifier from a terminal used by a second player, the first public identifier identifying the first player writes into the personal relationship data area the received first public identifier of the first player in association with a nonpublic or public identifier for the second player;
a transmitter that transmits to the terminal used by the second player an information element indicating a play status data element of the first player stored in the personal data area and identified by the first public identifier of the first player associated with the nonpublic or public identifier for the second player in the personal relationship data area; and
a public identifier changer for changing the first public identifier of the first player stored in the personal data area upon receiving a request for changing the first public identifier of the first player from a terminal used by the first player,
wherein upon changing the first public identifier for the first player in the personal data area, the public identifier changer transmits to the first player an information element imparting a second public identifier of the first player different from the first public identifier, and wherein the public identifier changer does not update the first public identifier for the first player stored in the personal relationship data area with the second public identifier;
each of the terminals comprising:
a friend-public-identifier input unit into which a player inputs a public identifier for another player;
a friend registration processor that transmits to the server apparatus the public identifier input into the friend-public-identifier input unit;
a receiver that receives information destined for the terminal from the server apparatus;
a self-public-identifier-change-instruction input unit into which the player inputs an instruction for changing a public identifier for the player; and
a public-identifier-change-processor that, upon inputting the instruction into the self-public-identifier-change-instruction input unit, transmits to the server apparatus a request for changing the public identifier for the player.

4. A game system comprising:
a plurality of game devices that can be operated by a plurality of players, respectively, and
a server apparatus communicable with each of the game devices, each of the game devices comprising:
a play data generator that generates a play data element indicating a result of a game whenever a player plays on the game device;
a reader that reads a recording medium identifier from an information recording medium of a player used for playing on the game device, the recording medium identifier being recorded in the information recording medium for identifying the information recording medium; and
a transmitter that transmits the generated play data element together with the read recording medium identifier whenever a player plays using the recording medium of the player;
the server apparatus comprising:
a memory unit comprising a personal data area for storing data written therein and a personal relationship data area for storing data written therein;
a play status data generator that generates a play status data element for a first player on the basis of a play data element whenever receiving a play data element together with a recording medium identifier from one of the game devices;
a personal data writer that writes into the personal data area the recording medium identifier, the play status data element for the first player, and a public identifier identifying the first player, in such a manner that the recording medium identifier is associated with the public identifier and the play status data element;
a self-public-identifier transmitter that transmits to the first player an information element imparting a first public identifier of the first player;
a personal relationship data writer that, upon receiving the first public identifier from a second player, the first public identifier identifying the first player, writes into the personal relationship data area the received first public identifier of the first player in association with the recording medium identifier for the information recording medium of the second player or a public identifier for the second player;
a transmitter that transmits to the second player an information element indicating a play status data element of the first player stored in the personal data area and identified by the first public identifier of the first player associated with the recording medium identifier for the information recording medium of the second player or public identifier for the second player in the personal relationship data area; and
a public identifier changer for changing the first public identifier of the first player stored in the personal data area upon receiving a request for changing the first public identifier of the first player from the first player,
wherein upon changing the first public identifier for the first player in the personal data area, the public identifier changer transmits to the first player an information element imparting a second public identifier of the first player different from the first public identifier, and wherein the public identifier changer does not update the first public identifier for the first player stored in the personal relationship data area with the second public identifier.

5. The game system according to one of claims 3 and 4, wherein the server apparatus further comprising a relationship clearer that determines whether the first public identifier is stored in the personal relationship data area, upon the first public identifier being changed to the second public identifier by the public identifier changer, and automatically clears the first public identifier in the personal relationship data area.

6. The server apparatus of claim 1, further comprising:
a public identifier generator which generates the first public identifier of the first user and stores the first public identifier of the first user in the personal data area in such a manner that the first public identifier of the first user is associated with a portable recording medium identifier of the first user and a player identifier of the first user.

7. The game system of claim 3, wherein the server apparatus further comprises:
a public identifier generator which generates the first public identifier of the first player and stores the first public identifier of the first player in the personal data area in such a manner that the first public identifier of the first player is associated with a portable recording medium identifier of the first player and a player identifier of the first player.

8. The game system of claim 4, wherein the server apparatus further comprises:
a public identifier generator which generates the first public identifier of the first player and stores the first public identifier of the first player in the personal data area in such a manner that the first public identifier of the first player is associated with the recording medium identifier of the first player and a player identifier of the first player.

9. The server apparatus of claim 6, wherein the first public identifier of the first user, the portable recording medium identifier of the first user and the player identifier of the first user are different.

10. The game system of claim 7, wherein the first public identifier of the first player, the portable recording medium identifier of the first player and the player identifier of the first player are different.

11. The game system of claim 8, wherein the first public identifier of the first player, the recording medium identifier of the first player and the player identifier of the first player are different.

12. The game system of claim 3, wherein a terminal for the second player comprising:
a friend-public-identifier input unit into which the second player inputs the first public identifier of the first player;
a friend registration processor that transmits to the server apparatus the first public identifier of the first player input into the friend-public-identifier input unit;
a receiver that receives information destined for the terminal from the server apparatus;
a self-public-identifier-change-instruction input unit into which the second player inputs an instruction for changing the public identifier for the second player; and
a public-identifier-change-processor that, upon inputting the instruction into the self-public-identifier-change-instruction input unit, transmits to the server apparatus a request for changing the public identifier for the second player.

* * * * *